US012128719B2

United States Patent
McCall et al.

(10) Patent No.: US 12,128,719 B2
(45) Date of Patent: *Oct. 29, 2024

(54) HITCH ASSEMBLY WITH A RECESSED DRAW BAR

(71) Applicant: B & W Custom Truck Beds, Inc., Humboldt, KS (US)

(72) Inventors: Travis M. McCall, Humboldt, KS (US); Joseph W. Works, Humboldt, KS (US); Michael D. Mueller, Humboldt, KS (US)

(73) Assignee: B &W Custom Trucks Beds, Inc., Humboldt, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,778

(22) Filed: Oct. 22, 2023

(65) Prior Publication Data

US 2024/0051360 A1 Feb. 15, 2024

Related U.S. Application Data

(60) Continuation of application No. 17/814,163, filed on Jul. 21, 2022, now Pat. No. 11,833,869, which is a division of application No. 17/025,162, filed on Sep. 18, 2020, now Pat. No. 11,453,260, which is a continuation of application No. 29/723,884, filed on Feb. 11, 2020, now Pat. No. Des. 924,108, and a continuation of application No. 29/723,885, filed on Feb. 11, 2020, now Pat. No. Des. 923,521, and a (Continued)

(51) Int. Cl.
*B60D 1/46* (2006.01)
*B60D 1/06* (2006.01)
*B60D 1/52* (2006.01)

(52) U.S. Cl.
CPC .............. *B60D 1/46* (2013.01); *B60D 1/065* (2013.01); *B60D 1/06* (2013.01); *B60D 1/52* (2013.01)

(58) Field of Classification Search
CPC .................................. B60D 1/46; B60D 1/52
See application file for complete search history.

(56) References Cited

U.S. PATENT DOCUMENTS

| 2,847,232 A | 8/1958 | Graham |
| 3,151,879 A | 10/1964 | Bock |
| (Continued) | | |

OTHER PUBLICATIONS

Photographs of admitted prior art: Cequent Hitch Drop Bar; On sale in the United States of America prior to Sep. 18, 2018 (See Exhibit A1 and A2). Sold by Cequent Peformance Products, Inc.

(Continued)

*Primary Examiner* — Kevin Hurley
(74) *Attorney, Agent, or Firm* — AVEK IP, LLC; Kent R. Erickson

(57) ABSTRACT

A hitch assembly adapted for securement in a tube receiver connected to a towing vehicle below its bumper includes a hitch base with a recessed profile. The hitch base includes a shaft sized for reception in the tube receiver and a draw bar connected to the shaft. The shaft is connected at a first end to an upper portion of the draw bar. The draw bar includes a plurality of pin receiving apertures extending laterally through a lower portion of the draw bar in vertical spaced alignment. The upper portion of the draw bar includes a recessed geometry or reduced profile relative to the lower portion of the draw bar.

18 Claims, 35 Drawing Sheets

Related U.S. Application Data continuation of application No. 29/722,744, filed on Jan. 31, 2020, now Pat. No. Des. 922,913, and a continuation of application No. 29/722,728, filed on Jan. 31, 2020, now Pat. No. Des. 913,863, and a continuation of application No. 29/711,151, filed on Oct. 29, 2019, now Pat. No. Des. 913,861, and a continuation of application No. 29/711,192, filed on Oct. 29, 2019, now Pat. No. Des. 913,862, and a continuation of application No. 29/706,369, filed on Sep. 19, 2019, now Pat. No. Des. 934,741, and a continuation of application No. 29/706,377, filed on Sep. 19, 2019, now Pat. No. Des. 934,744, and a continuation of application No. 29/706,375, filed on Sep. 19, 2019, now Pat. No. Des. 934,743, and a continuation of application No. 29/706,372, filed on Sep. 19, 2019, now Pat. No. Des. 934,742.

(60) Provisional application No. 62/983,189, filed on Feb. 28, 2020, provisional application No. 62/929,286, filed on Nov. 1, 2019.

(56) References Cited

U.S. PATENT DOCUMENTS

| | | | |
|---|---|---|---|
| 4,033,601 A | 7/1977 | Lindahl et al. | |
| 5,465,991 A | 11/1995 | Kass et al. | |
| 6,460,870 B2 | 10/2002 | Moss | |
| 6,712,381 B1 | 3/2004 | Moss | |
| 6,769,710 B1 | 8/2004 | Lim | |
| 6,789,815 B2 | 9/2004 | Moss et al. | |
| 6,974,148 B2 | 12/2005 | Moss et al. | |
| 7,004,492 B2 | 2/2006 | Moss et al. | |
| 7,029,022 B2 | 4/2006 | Moss | |
| 7,125,036 B2 | 10/2006 | Moss et al. | |
| 7,204,505 B2 | 4/2007 | Moss | |
| 7,819,416 B2 | 10/2010 | Moss | |
| D894,800 S | 9/2020 | Noel | |
| D909,922 S | 2/2021 | Siegel et al. | |
| D913,861 S | 3/2021 | McCall | |
| D913,862 S | 3/2021 | McCall | |
| D922,264 S | 6/2021 | Han | |
| D922,265 S | 6/2021 | Han | |
| D922,913 S | 6/2021 | Works | |
| D922,914 S | 6/2021 | Works | |
| D923,521 S | 6/2021 | Works et al. | |
| D924,108 S | 7/2021 | Works et al. | |
| D926,088 S | 7/2021 | Hart | |
| 11,192,408 B2 | 12/2021 | Fisher et al. | |
| 11,325,434 B2 | 5/2022 | Pennington | |
| 2005/0173893 A1 | 8/2005 | Buckley et al. | |
| 2021/0155062 A1 | 5/2021 | Drury | |

OTHER PUBLICATIONS

Photographs of admitted prior art: Husky Liners Drop Bar; On sale in the United States of America prior to Sep. 18, 2018 (See Exhibit B1 and B2). Sold by Husky Liners, Inc. Currently offered for sale at https://www.ebay.com/b/Husky-Liners-Car-Truck-Towing-Hauling/33653/bn_21008096.

Photographs of admitted prior art: Fastway Trailer Products Drop Bar; On sale in the United States of America prior to Sep. 18, 2018 (See Exhibit C1 and C2). Sold by Progress Mfg. Inc. Currently offered for sale on etrailer.com at https://www.etrailer.com/Trailer-Hitch-Ball-Mount/B-and-W/BWTS10048B.html?feed=npn&gclid=CjwKCAiAp4KCBhB6EiwAxRxbpIJQAjVtrb81UekAFeyovn0mVhKgCJVIIOjOyYVaKJ5V9kKN7sWluxoCep8QAvD_BwE.

Photographs of admitted prior art: B & W Trailer Hitches Drop Bar; On sale in the United States of America prior to Sep. 18, 2018 (See Exhibit D1 and D2). Sold by B&W Custom Truck Beds, Inc. Currently offered for sale at https://www.etrailer.com/Trailer-Hitch-Ball-Mount/B-and-W/BWTS10048B.html?feed=npn&gclid=CjwKCAiAp4KCBhB6EiwAxRxbpIJQAjVtrb81UekAFeyovn0mVhKgCJVIIOjOyYVaKJ5V9kKN7sWluxoCep8QAvD_BwE.

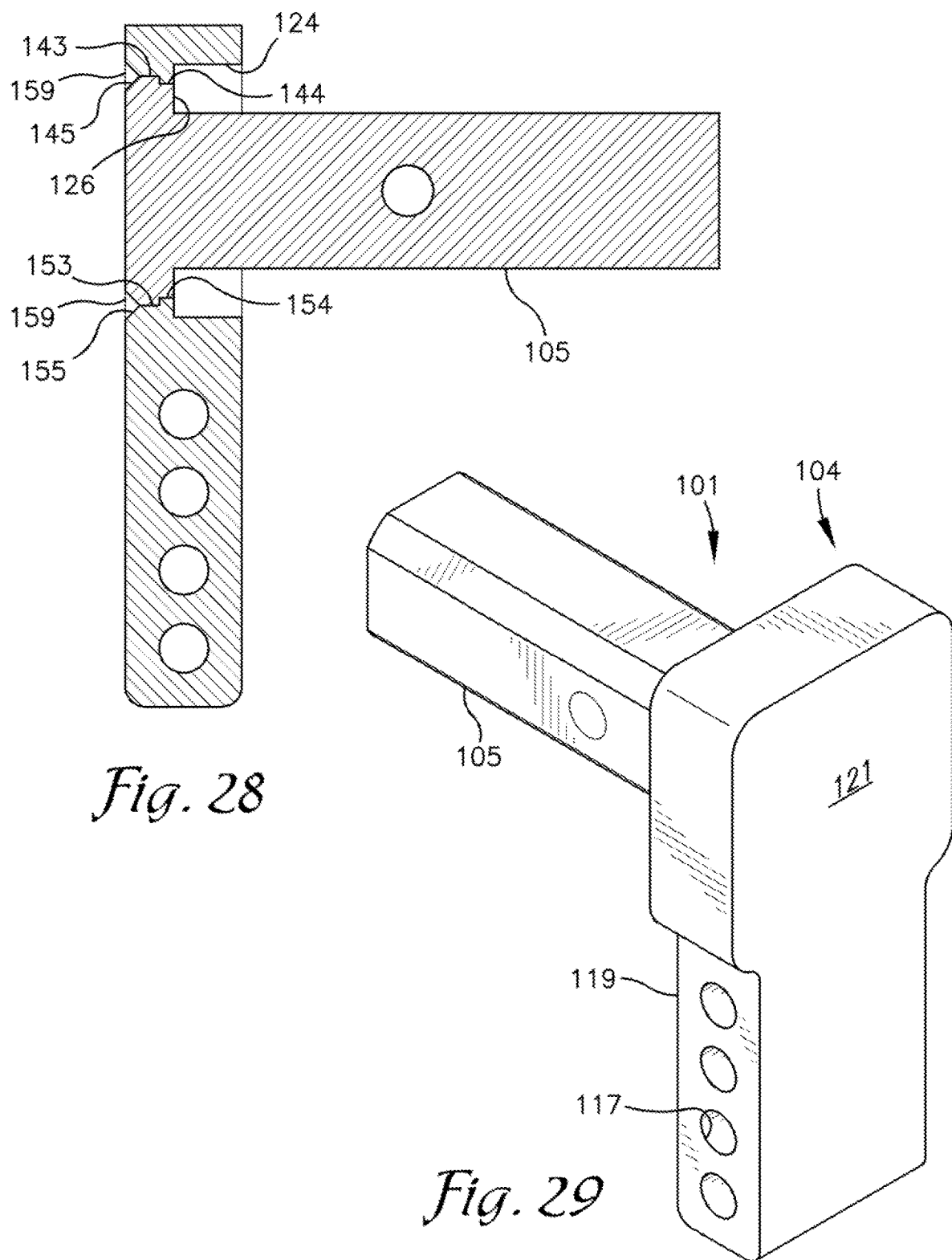

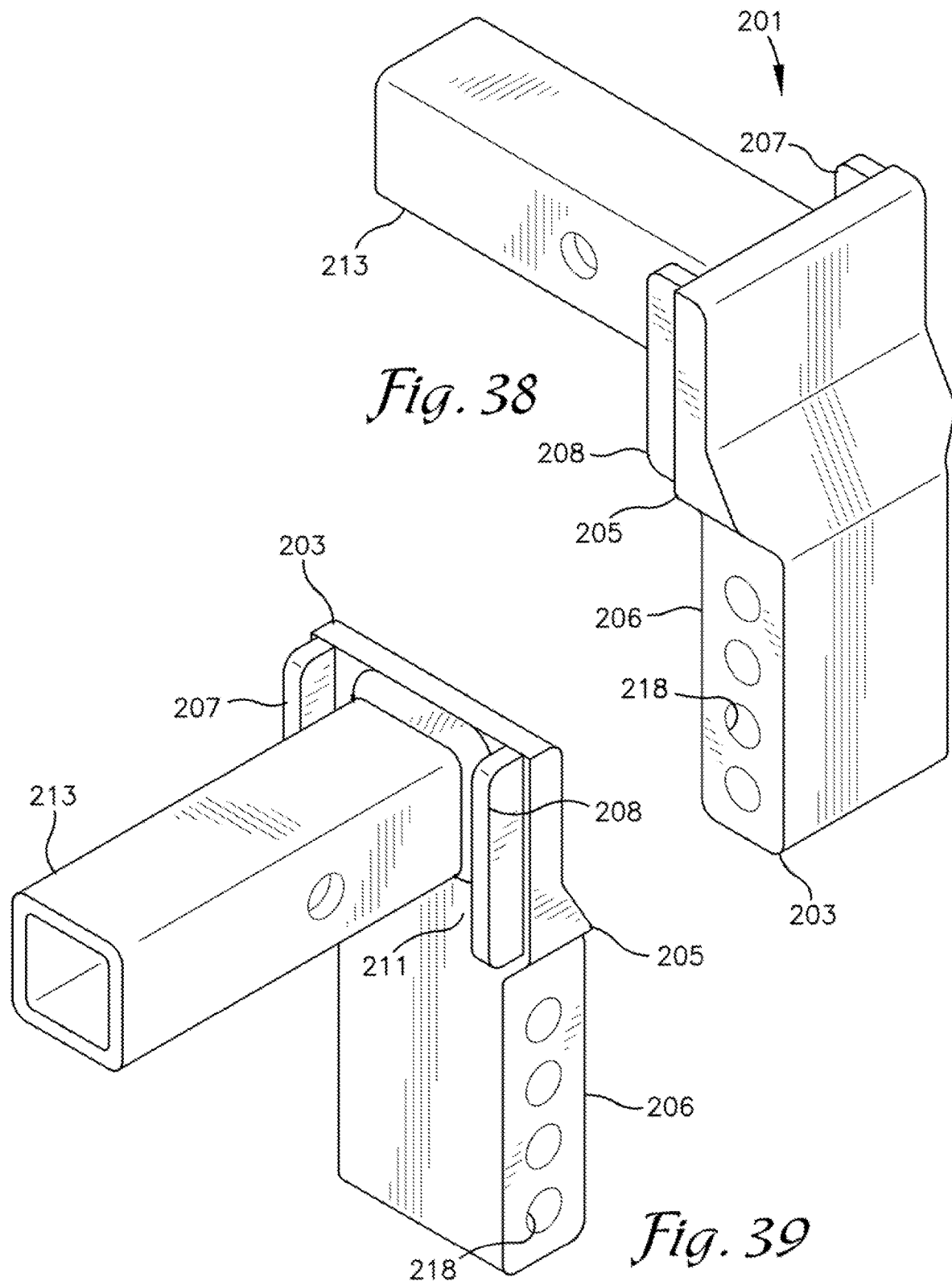

HITCH ASSEMBLY WITH A RECESSED DRAW BAR

CROSS-REFERENCE TO RELATED APPLICATIONS

This application is a continuation of U.S. application Ser. No. 17/814,163, filed Jul. 21, 2022, which is a divisional of U.S. application Ser. No. 17/025,162, filed Sep. 18, 2020, now issued U.S. Pat. No. 11,453,260, issued Sep. 27, 2022, that claims the benefit of U.S. Provisional Patent Application No. 62/983,189, filed Feb. 28, 2020 and U.S. Provisional Patent Application No. 62/929,286 filed Nov. 1, 2019. U.S. application Ser. No. 17/025,162 is a continuation-in-part of the following applications: U.S. Design patent application Ser. No. 29/706,372, filed Sep. 19, 2019; now issued Patent No. D934,742, issued Nov. 2, 2021, Ser. No. 29/706,375, filed Sep. 19, 2019, now issued Patent No. D934,743, issued Nov. 2, 2021, Ser. No. 29/706,377, filed Sep. 19, 2019, now issued Patent No. D934,744, issued Nov. 2, 2021, Ser. No. 29/706,369, filed Sep. 19, 2019, now issued Patent No. D934,741, issued Nov. 2, 2021, Ser. No. 29/711,192, filed Oct. 29, 2019, now issued Patent No. D913,862, issued Mar. 23, 2021, Ser. No. 29/711,151, filed Oct. 29, 2019, now issued Patent No. D913,861, issued Mar. 23, 2021, Ser. No. 29/723,884, filed Feb. 11, 2020, now issued Patent No. D924,108, issued Jul. 6, 2021, Ser. No. 29/723,885, filed Feb. 11, 2020, now issued Patent No. D923,521, issued Jun. 29, 2021, Ser. No. 29/722,744, filed Jan. 31, 2020, now issued Patent No. D922,913, issued Jun. 22, 2021, and Ser. No. 29/722,728, filed Jan. 31, 2020, now issued Patent No. D913,863, issued Mar. 23, 2021 each of the disclosures of which are incorporated by reference herein.

FIELD OF THE INVENTION

The present invention relates generally to bumper hitches or rear receiver hitches.

BACKGROUND OF THE INVENTION

Receiver hitches which are removably mounted on the rear of a towing vehicle or truck remain popular. The receiver typically comprises a square tube mounted to the vehicle frame with reinforcing structure. Hitches used with the receivers include a shaft or trunnion sized for receipt in and securement to the receiver tube and a support structure for supporting one or more hitch balls to which a trailer coupler is connected for securing the trailer to the towing vehicle. A pin is inserted through aligned pin receiving holes formed through the receiver on both sides of the square tube and through the shaft of the hitch for releasably securing the hitch to the receiver.

A wide variety of hitch ball support structure have been developed to permit adjustment of the height of the hitch ball relative to the towing vehicle and to allow the selection of two or more different sized hitch balls for use with trailers sized to receive a variety of sized hitch balls. U.S. Pat. No. 6,974,148 of Moss et al. and assigned to B & W Custom Truck Beds, Inc. discloses one such hitch which is sold commercially as the TOW & STOW Hitch. The hitch ball support structure shown comprises a base connected to the trunnion and which may be referred to as a draw bar or drop bar, and a mount or slider which slides vertically relative to the drop bar. A hitch ball assembly comprising two or three different sized hitch balls is rotatably connected to the slider and the balls are selectively rotatable to and securable in a towing position. The slider or ball mount is pivotally mounted relative to the draw bar to allow the mount and hitch balls to be pivoted between a towing position extending behind the draw bar when connected to a vehicle and a stowed position below the receiver and shaft of the hitch.

The draw bar of the TOW & STOW Hitch is formed from an elongate block with vertically aligned pin receiving holes extending laterally therethrough to receive one or two locking pins insertable through holes in the hitch ball mount to secure the hitch ball mount to the draw bar at a selected height. Pivot pins extending inward from opposite sides of the hitch ball mount are received in guide slots extending into the lateral sides of the draw bar in vertical alignment with the pin receiving holes to pivotally couple the hitch ball mount to the draw bar. With the locking pins removed, the hitch ball mount is pivotable between a towing and stowed position without separating the hitch ball mount from the draw bar. Competing hitches which have been developed to allow vertical adjustment of the hitch ball mount relative to the draw bar have eliminated the guide slot.

The shaft or trunnion of the TOW & STOW and competing hitches is connected to and extends transverse to a face of the draw bar proximate one end thereof. The hitches may be secured in the receiver with the draw bar extending downward or upward from the shaft to increase the height adjustability of the hitch ball mount and hitch balls mounted thereon. Use of the stowing feature of the TOW & STOW hitch requires the drop bar to be oriented to extend downward from the trunnion so that the hitch ball mount and the attached hitch balls may be pivoted under the trunnion and the receiver of the receiver hitch below its mounting to the vehicle and without having to remove the hitch ball mount or ball assembly. The drop bar can therefore be left installed in the receiver and the hitch ball mount and hitch balls can remain connected to the drop bar when not used for towing. Competing hitches that do not provide the stowing function required leaving the hitch ball mount and hitch balls in the towing position or removing them from the draw bar for storing in the towing vehicle or elsewhere.

In 2018, General Motors Company introduced a multi-hinged tailgate assembly as its MultiPro brand Tailgate as generally shown in U.S. Pat. No. 8,201,869. The MultiPro tailgate has a first portion pivotally connected to the truck frame and a second portion pivotally connected to the first portion. As shown in FIG. 3 of the '869 patent, when the first portion is pivoted downward ninety degrees and the second portion pivoted downward another ninety degrees relative to the first portion, the second portion extends just rearward of the bumper and a distal end of the second portion extends in closely spaced relation behind a receiver mounted to the truck for receiving a hitch assembly. The spacing between the second portion of the tailgate assembly in the lowered position and the receiver is generally insufficient to allow for clearance of a hitch ball mount in the receiver. Lowering of the second portion of the tailgate assembly to the lowered position with existing draw bars for commercially available hitches secured in place relative to the receiver will result in denting or scratching of the second portion as it advances against the draw bar and the draw bar will prevent the second portion of the tailgate from extending truly vertical.

There is a need for a hitch assembly which will not interfere with the second portion of the MultiPro tailgate assembly when lowered to extend vertically behind the towing vehicle bumper and receiver for a receiver type hitch.

SUMMARY OF THE INVENTION

The present invention is directed to a hitch assembly adapted for securement in a tube receiver connected to a towing vehicle below its bumper. The hitch assembly includes a hitch base including a shaft sized for reception in the tube receiver and a draw bar connected to the shaft. The shaft is connected at a first end thereof to a first or upper portion of the draw bar. The draw bar includes a plurality of pin receiving apertures extending laterally through a second or lower portion of the draw bar in vertical spaced alignment. The upper portion of the draw bar includes a recessed geometry or reduced profile relative to the lower portion of the draw bar. The shaft may be connected to the draw bar by welding or through a mechanical coupling or the shaft may be connected to the draw bar by forming the shaft integrally with the draw bar.

In one embodiment, a rear face of the upper portion of the draw bar slopes downward and rearward at an acute angle relative to a front face of the draw bar so that the upper end of the upper section is thinner than a lower end of the upper section where it connects to the lower portion of the draw bar. In a second embodiment, a rear face of an upper section of the upper portion of the draw bar extends parallel to the front face of the draw bar, but is recessed relative to a rear face of the lower section of the draw bar so that the upper section is thinner than the lower portion of the draw bar. A rear face of a lower section of the upper portion of the draw bar slopes at an acute angle downward and rearward relative to the front face of the draw bar. Further geometries of the rear face of the draw bar are contemplated, including forming the rear face of the upper section as a convex or concave curve or a compound curve of convex and concave segments or combinations of the geometries described and shown.

In a third embodiment the front face of the upper section is recessed rearward relative to a front face of the lower section of the draw bar. In another embodiment, the upper portion of the draw bar is wider than the lower portion and a recess is formed between sidewall flanges. The shaft is connected to the upper portion and projects forward from a relatively thin web of the upper portion formed between the sidewall flanges. A gap formed by the recess extending around the shaft is sized for reception of the distal end of the tube receiver between the shaft and the sidewall flanges when the shaft is secured within the receiver. The sidewall flanges resist shearing of the draw bar from the shaft.

In one embodiment of the draw bar with the shaft positioned in the recess, the shaft is centered relative to the web and a top wall flange extends across an upper edge of the upper portion and is connected between the sidewall flanges. The shaft is formed with an enlarged head which is secured within a weldment hole formed in the web and welded in place.

BRIEF DESCRIPTION OF THE DRAWINGS

FIG. 28 is a cross-sectional view, similar to FIG. 27, showing the shaft secured to the draw bar prior to welding.

FIG. 29 is a modified version of the embodiment of the draw bar and shaft as shown in FIG. 19 without guide pin receiving slots formed in a lower portion of the draw bar.

FIG. 38 is a rear, perspective view of a tenth alternative of a hitch assembly base comprising a draw bar and shaft for use with a height adjustable, multi-ball hitch assembly.

FIG. 39 is a front, perspective view of the hitch assembly base as in FIG. 38.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Figure 1:
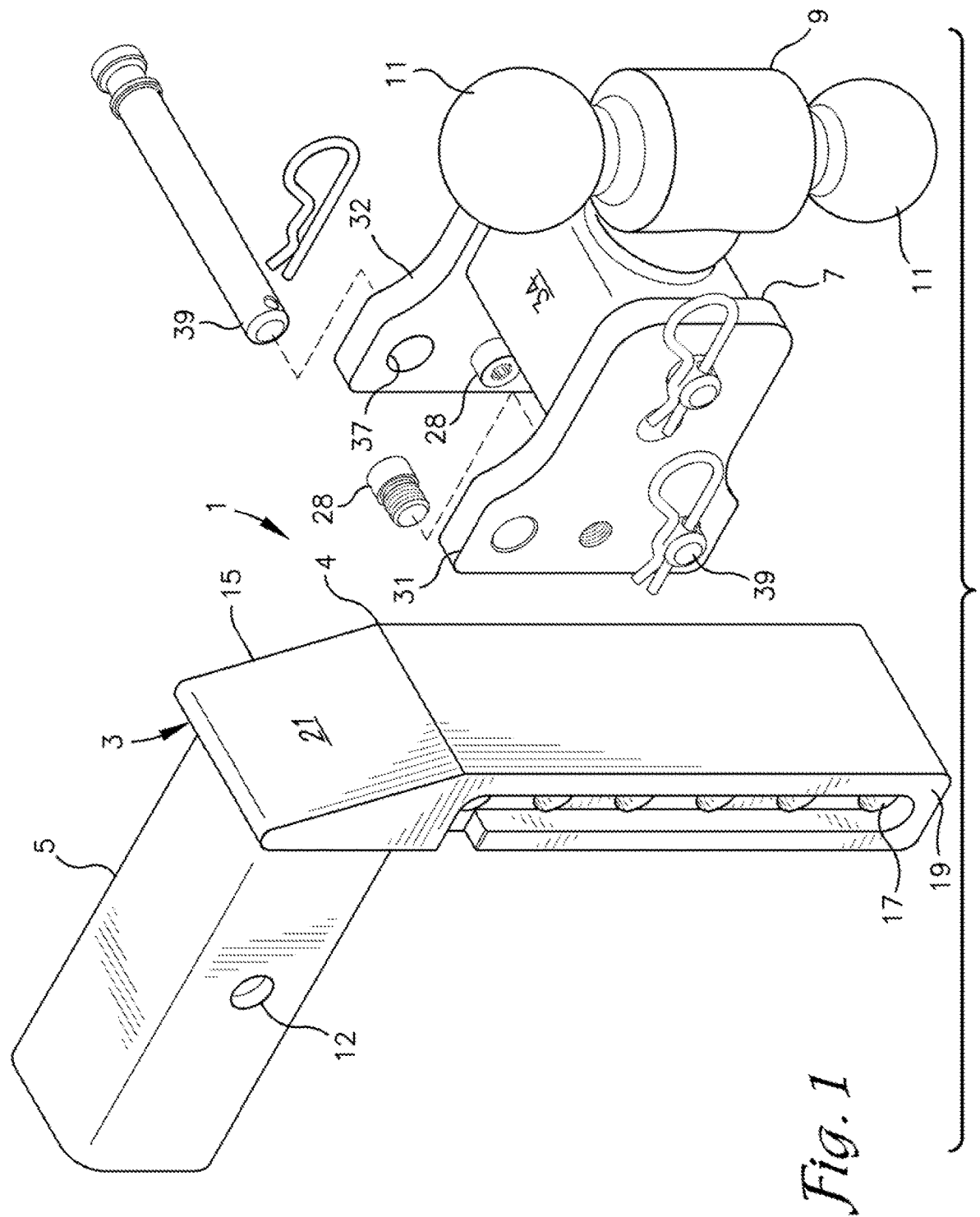
FIG. 1 is an exploded, rear, perspective view of a height adjustable, multi-ball hitch assembly.
Figure 2:
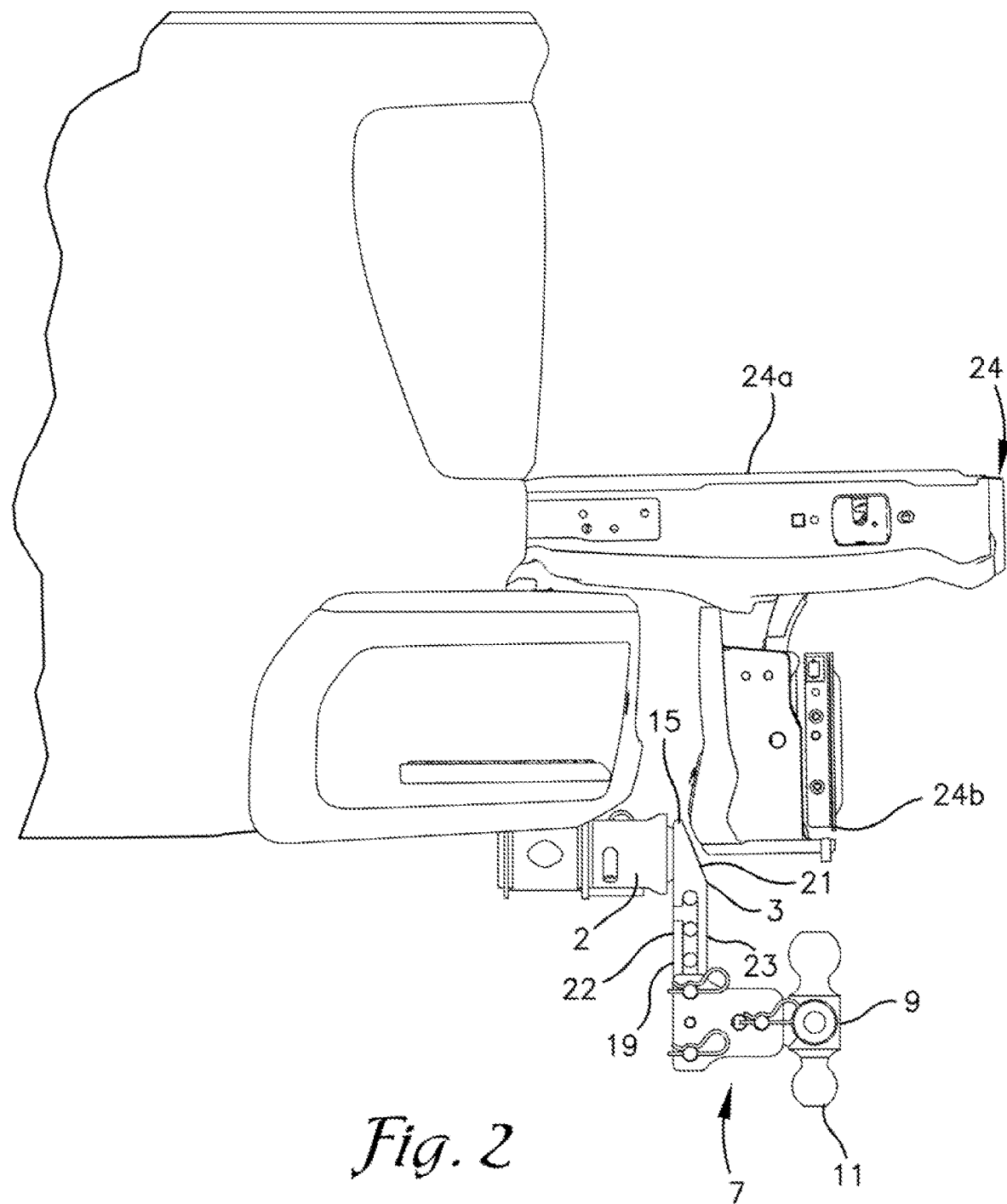
FIG. 2 is a fragmentary side, elevational view of the hitch assembly of FIG. 1 secured within a hitch receiver mounted on a pickup truck with a MultiPro tailgate assembly shown in a lowered configuration.
Figure 3:
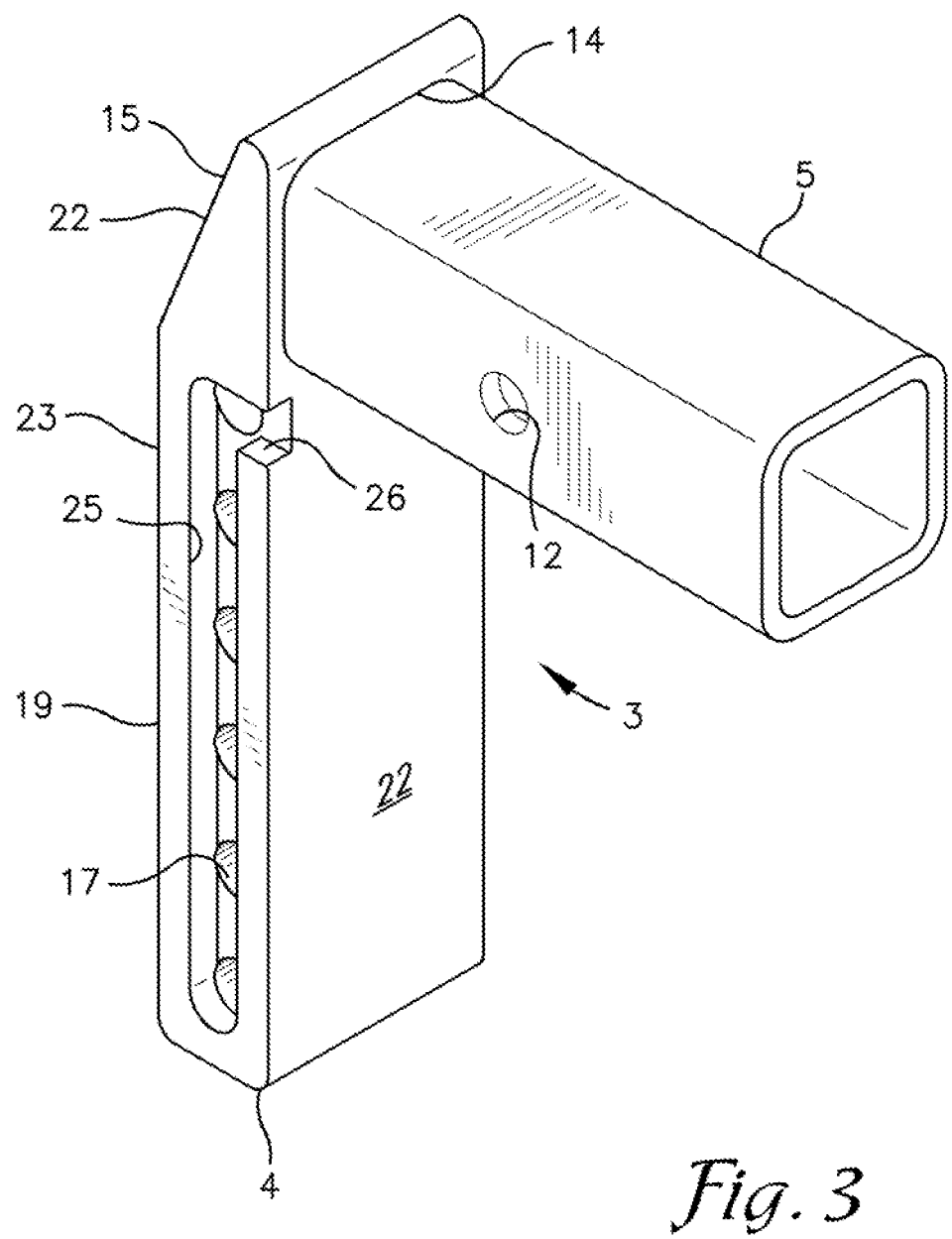
FIG. 3 is a front, perspective view of a base of the hitch assembly in FIG. 1 including a draw bar and a shaft.

Referring to FIGS. 1-4, a hitch assembly 1 which is securable within a square tube receiver 2 mounted to extend below the rear bumper of a towing vehicle as shown in FIG. 2. The hitch assembly 1 includes a hitch base 3 having a draw bar or drop bar 4 connected to a shaft or trunnion 5, a hitch ball mount 7 securable to the draw bar 4 at a selected relative height and a hitch ball assembly 9 rotatably supported on the hitch ball mount 7 to allow a user to selectively position one of a plurality of hitch balls 11 in position to connect to a hitch ball coupler on a trailer (not shown). As used herein, directional references are generally with reference to the orientation of a towing vehicle to which the hitch assembly 1 is attached. With reference to the hitch base 3 in FIG. 4, the front of the draw bar 4 is to the left on the page and the rear is to the right on the page. Similarly, the top or upper portion of the hitch base 3 extends toward the top of the page and the bottom or lower portion extends toward the bottom of the page. As used herein the word connect or connected or variations thereof include parts or components that are both formed separately and joined together as by welding or through a mechanical coupling or parts or components that are integrally formed together such as by casting, molding or extrusion. For example, reference to shaft 5 connected to draw bar 4 may include such assemblies that are welded together or otherwise joined mechanically as well as such assemblies that are molded, cast or extruded together as a single piece.

The shaft 5 of the hitch base 3 is approximately square in cross-section and sized to fit snugly within a tube forming the square tube receiver 2 with which the hitch assembly 1 is adapted for use. Common sizes of the internal dimensions of such tubes are 2 inches by 2 inches or 2½ inches by 2½ inches. A pin receiving aperture 12 is formed through the shaft 5 at a point selected to align with holes 13 extending through the sidewalls of the receiver 2 to permit a pin (not shown) to be inserted through the holes 13 in the receiver 2 and the aligned pin receiving aperture 12 in the hitch shaft 5 to secure the hitch assembly 1 in the receiver.

The draw bar 4 is formed as an elongate block. An inner or rear end 14 of the shaft 5 is connected to and extends transverse to and forward from a first or upper portion 15 of the draw bar 4. The draw bar 4 includes a plurality of pin receiving features or apertures 17 extending laterally through a second or lower portion 19 of the draw bar 4 in vertically spaced alignment along the lower portion 19 of the draw bar 4. Six pin receiving apertures 17 are shown in the draw bar 4 of FIGS. 1-4. The draw bar 4 is shown in FIGS. 1-4 in a commonly used orientation in which the lower portion 19 of the draw bar 4 extends below the shaft 5 and below the receiver 2 in which the shaft 5 is secured. It is contemplated however, that in some circumstances, the orientation of the draw bar 4 will be reversed so that the lower portion 19 extends above the shaft 5 and receiver in which the shaft is received. As used herein, reference to the first and second portions 15 and 19 of the draw bar 4 as the upper and lower portions 15 and 19 is with respect to the more common orientation as shown in FIGS. 1-4.

The upper portion 15 of the draw bar 4 has a recessed geometry relative to the lower portion 19. In the embodiment shown in FIGS. 1-4, a rear face 21 of the upper portion 15 of the draw bar 4 slopes downward and rearward at an acute angle of approximately twenty-two degrees relative to a front face 22 of the draw bar 4 so that the upper end of the draw bar upper portion 15 is narrower than and does not extend as far rearward as the lower end of the upper section 15 where it transitions into the lower portion 19 having rear face 23. When the hitch base 3 is secured within the hitch receiver 2 of a truck incorporating the MultiPro tailgate, the reduced thickness of the upper portion 15 of the draw bar 4 does not interfere with the MultiPro tailgate 24 when first and second portions of the tailgate 24a and 24b are lowered to a lowered position as shown in FIG. 2.

Figure 4:
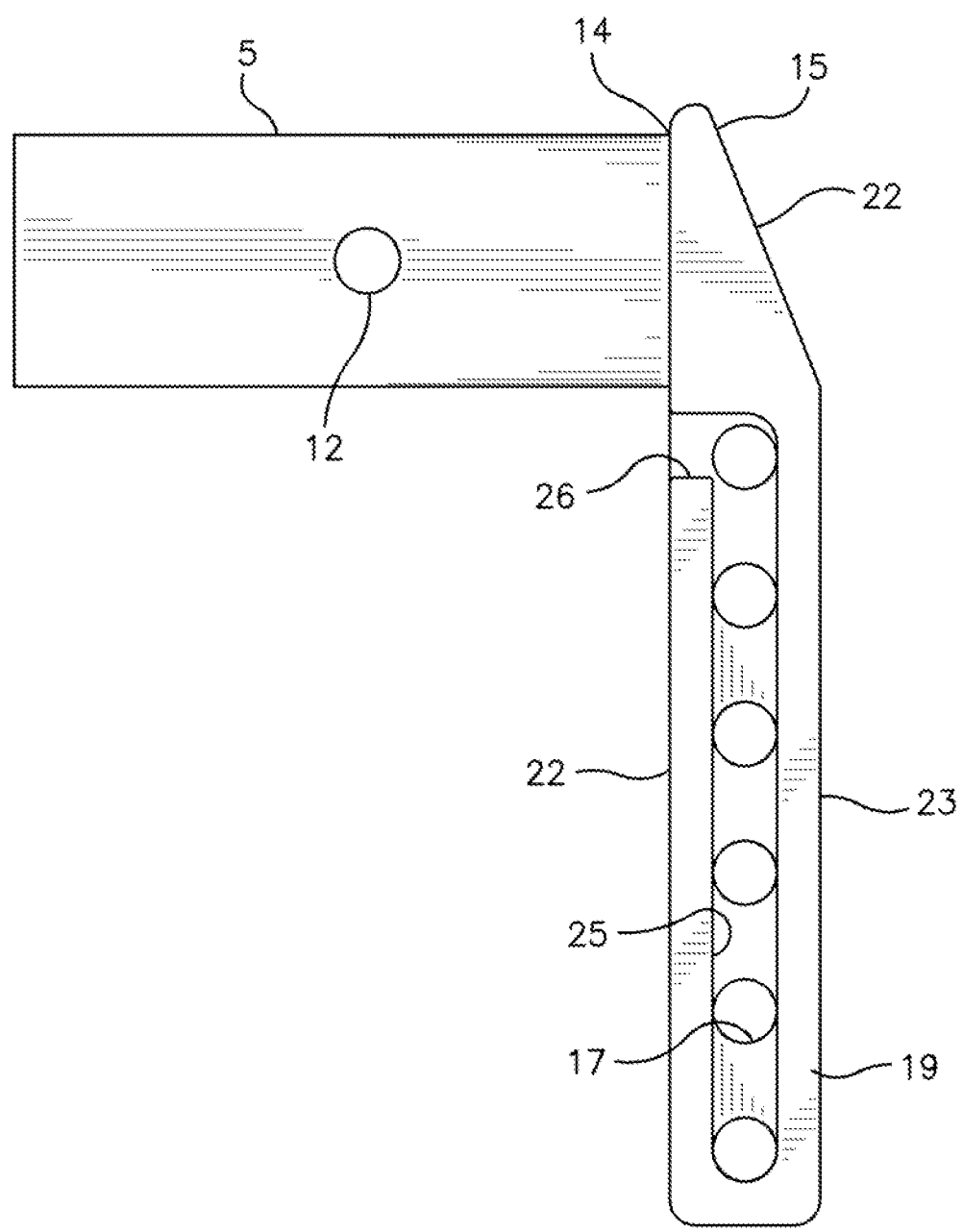
FIG. 4 is a left elevational view of the hitch assembly base as in FIG. 1.
Figure 5:
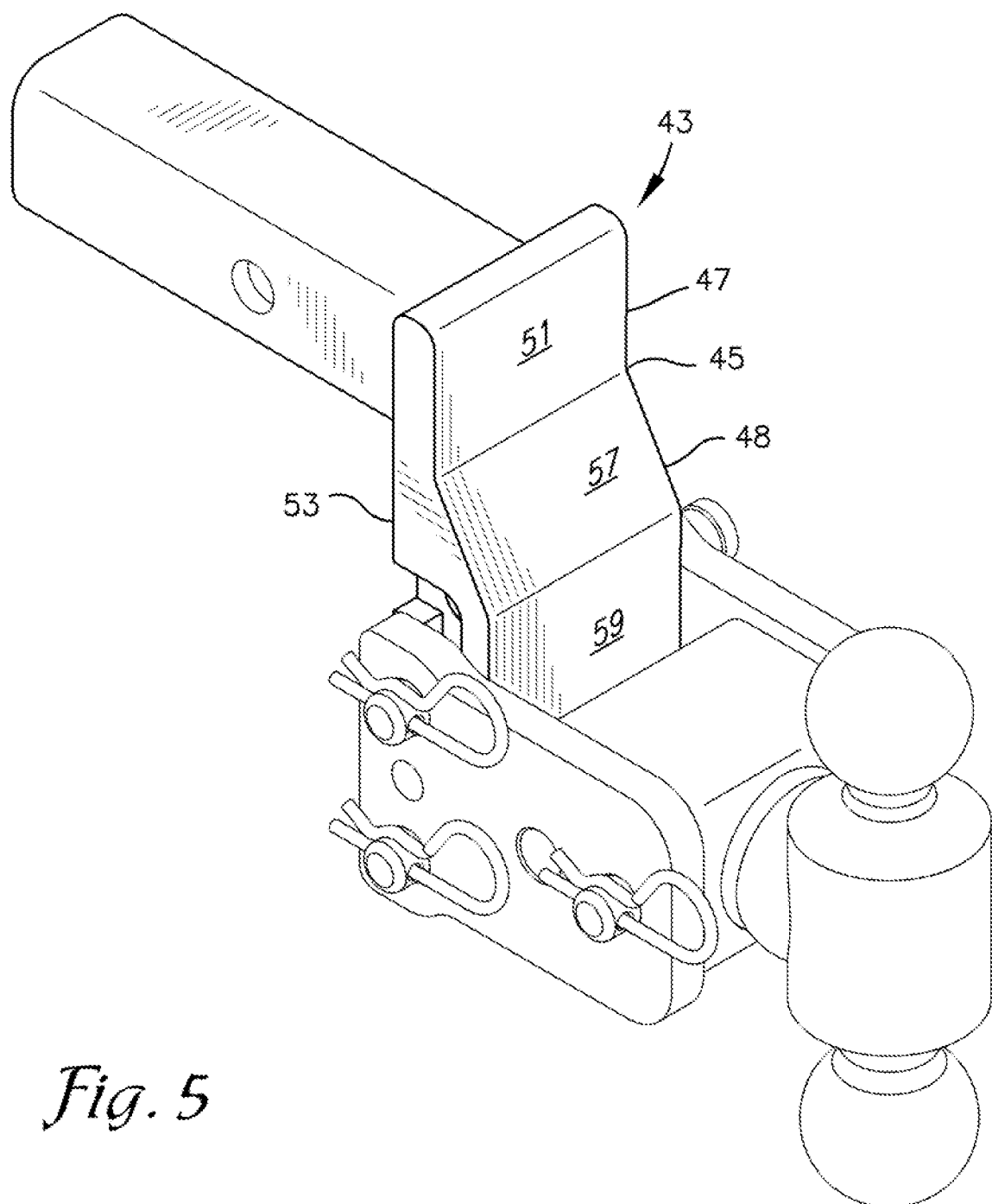
FIG. 5 is a rear, perspective view of a first alternative height adjustable, multi-ball hitch assembly.
Figure 6:
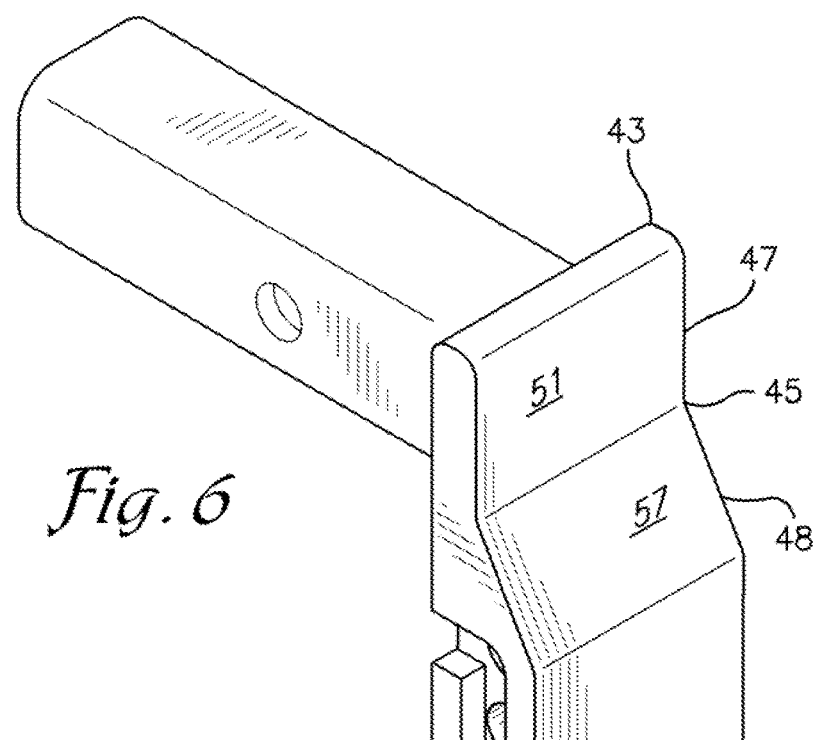
FIG. 6 is a rear, perspective view of a base of the hitch assembly as in FIG. 5.
Figure 7:
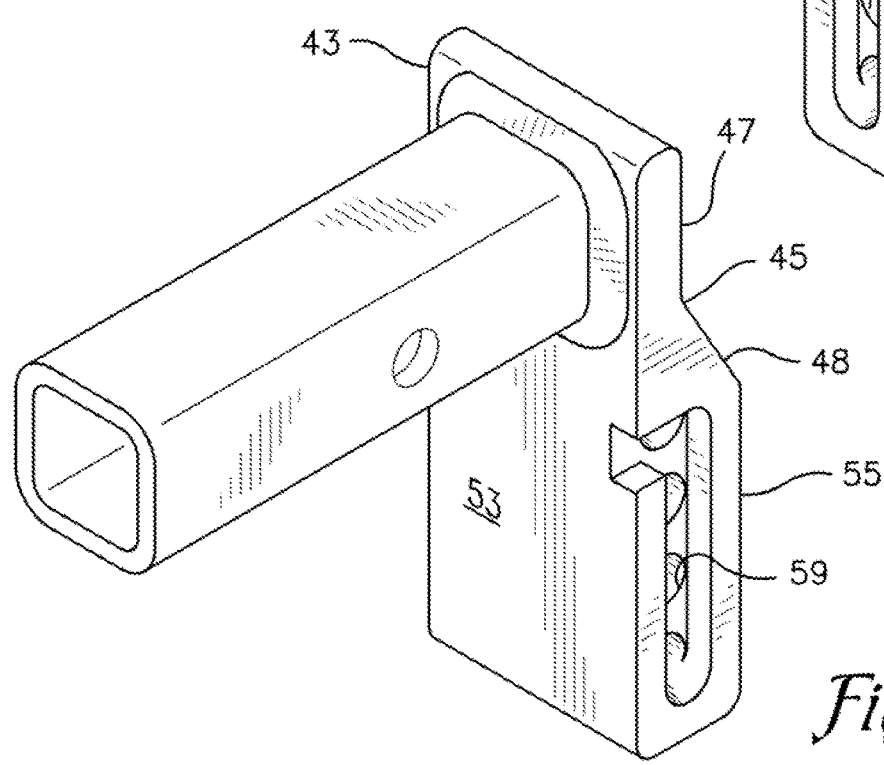
FIG. 7 is a front, perspective view of the hitch assembly base as in FIG. 5.
Figure 8:
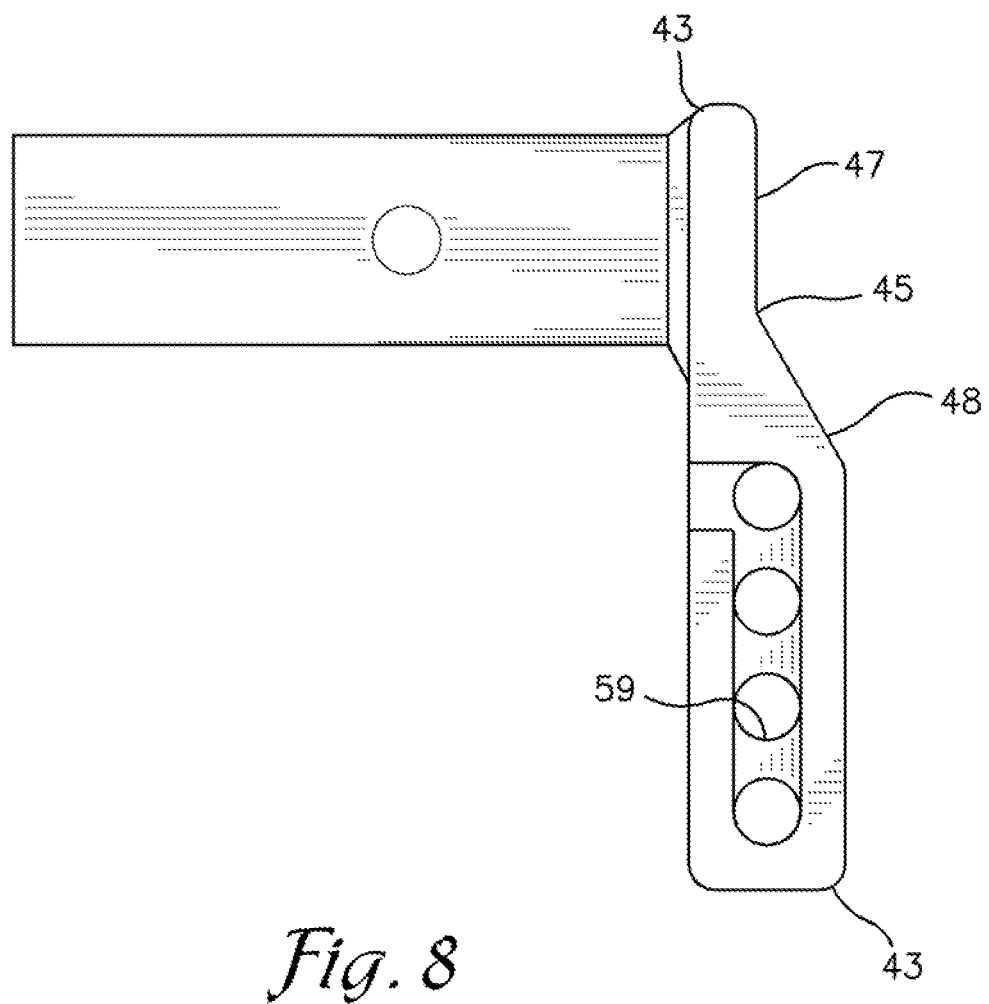
FIG. 8 is a left elevational view of the hitch assembly base as in FIG. 5.

As best seen in FIG. 4, the rear face 23 of the lower portion 19 of draw bar 4 preferably extends parallel to the front face 22 of the draw bar 4 including along the lower portion 19 thereof. A guide slot or channel 25 is formed in each side of the draw bar 4 (which are mirror images) and extends across and in alignment with the pin receiving apertures 17 in the draw bar 4. Each guide slot 25 includes an access leg 26 extending to the front face 22 of the draw bar 4. With reference to FIG. 1, each guide slot 25 is sized to receive a guide pin 28 projecting inward from opposed mounting flanges 31 and 32 of the hitch ball mount 7. The mounting flanges 31 and 32 are connected to and supported on opposite sides of a platform 34 of the hitch ball mount 7 to which the hitch ball assembly 9 is rotatably secured.

Two pairs of pin receiving holes 37 are formed through the mounting flanges 31 and 32. With the guide pins 28 extending in the guide slots 25, securement pins 39 are insertable through aligned sets of pin receiving holes 37 in the mounting flanges 31 and 32 and pin receiving apertures 17 in the draw bar 3 to secure the hitch ball mount 7 to the draw bar 3 at a selected height. The hitch ball mount 7 may be pinned to the draw bar 4 to extend rearward of the draw bar 4 for towing or may be pinned to the draw bar 4 to extend forward of the draw bar 4 and under the shaft 5 in a stowed position. The pin receiving apertures 17 comprise a first position securement feature on the draw bar 4 and the securement pins 39 comprise a second position securement feature associated with the hitch ball mount 7 useable to secure the hitch ball mount 7 to the draw bar 4 at one of a plurality of selected heights relative thereto.

In the embodiment shown in FIGS. 1-4, the hitch ball assembly 9 includes two different sized hitch balls 11. It is foreseen that the hitch ball assembly could include three or four different sized hitch balls or one hitch ball. The construction of the hitch ball mount 7 and the hitch ball assembly 9 to permit rotation of the hitch ball assembly 9 relative to the mount 7 and pinning it in the selected orientation may be similar to that shown in U.S. Pat. No. 7,125,036 which is incorporated herein by reference.

Figure 9:
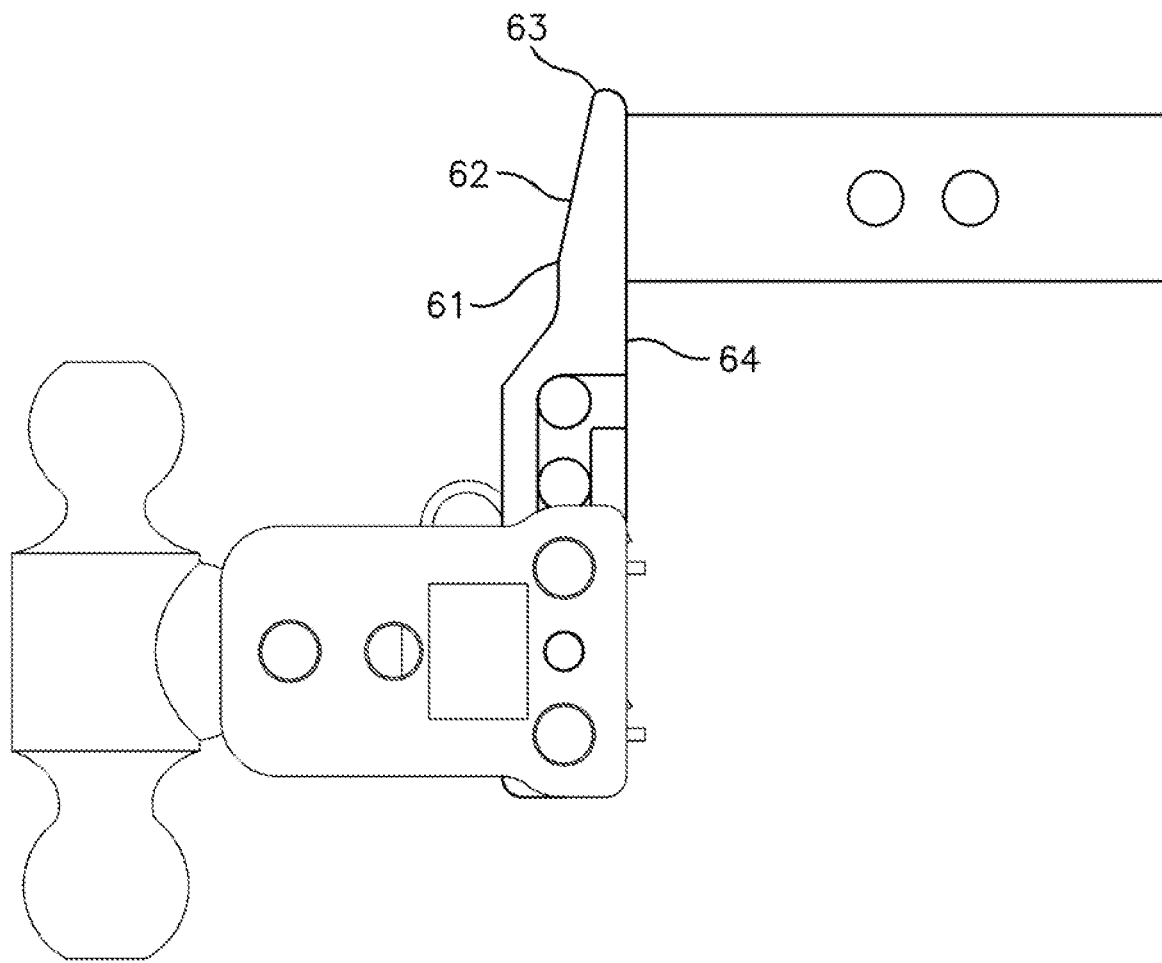
FIG. 9 is a right elevational view of a second alternative embodiment of the height adjustable, multi-ball hitch assembly.
Figure 10:
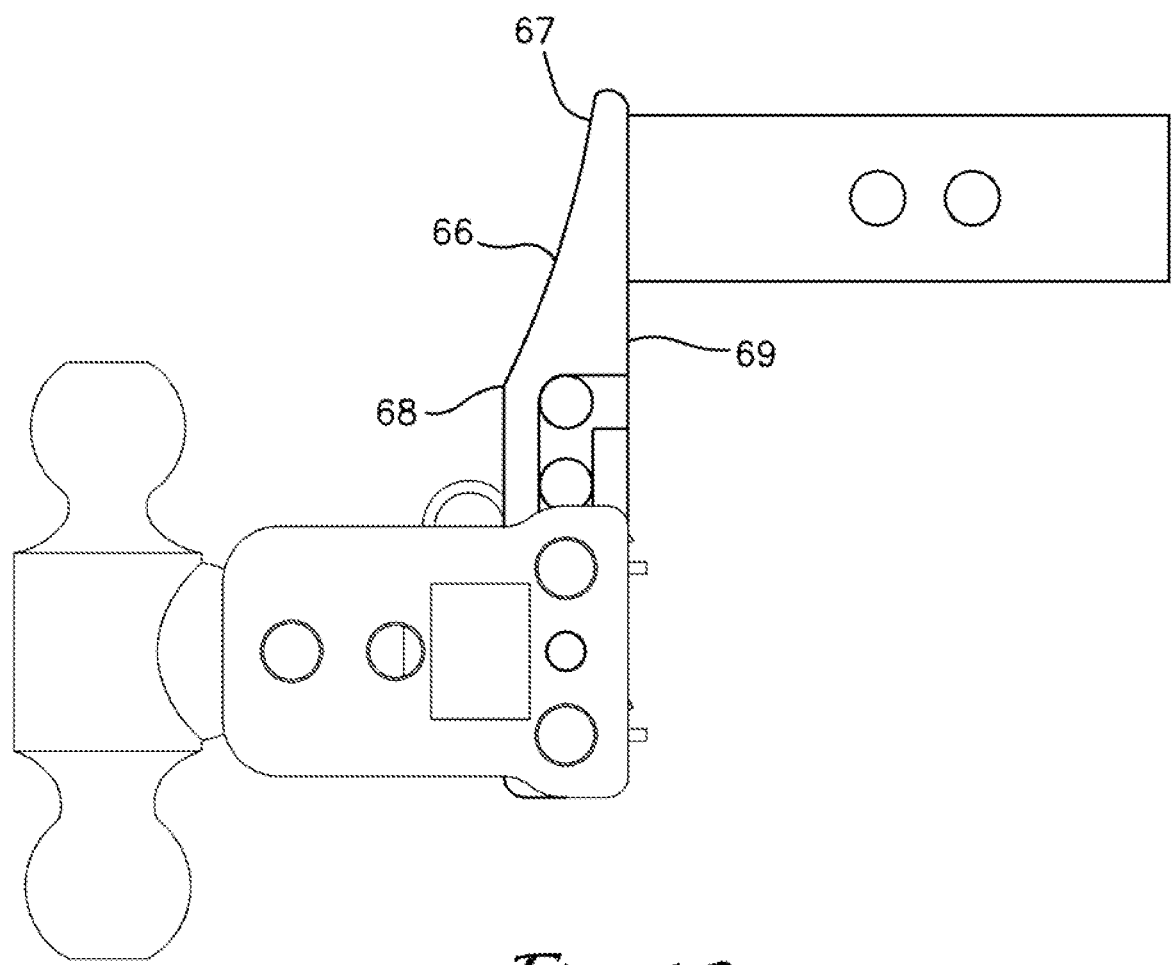
FIG. 10 is a right elevational view of a third alternative embodiment of the height adjustable, multi-ball hitch assembly.
Figure 11:
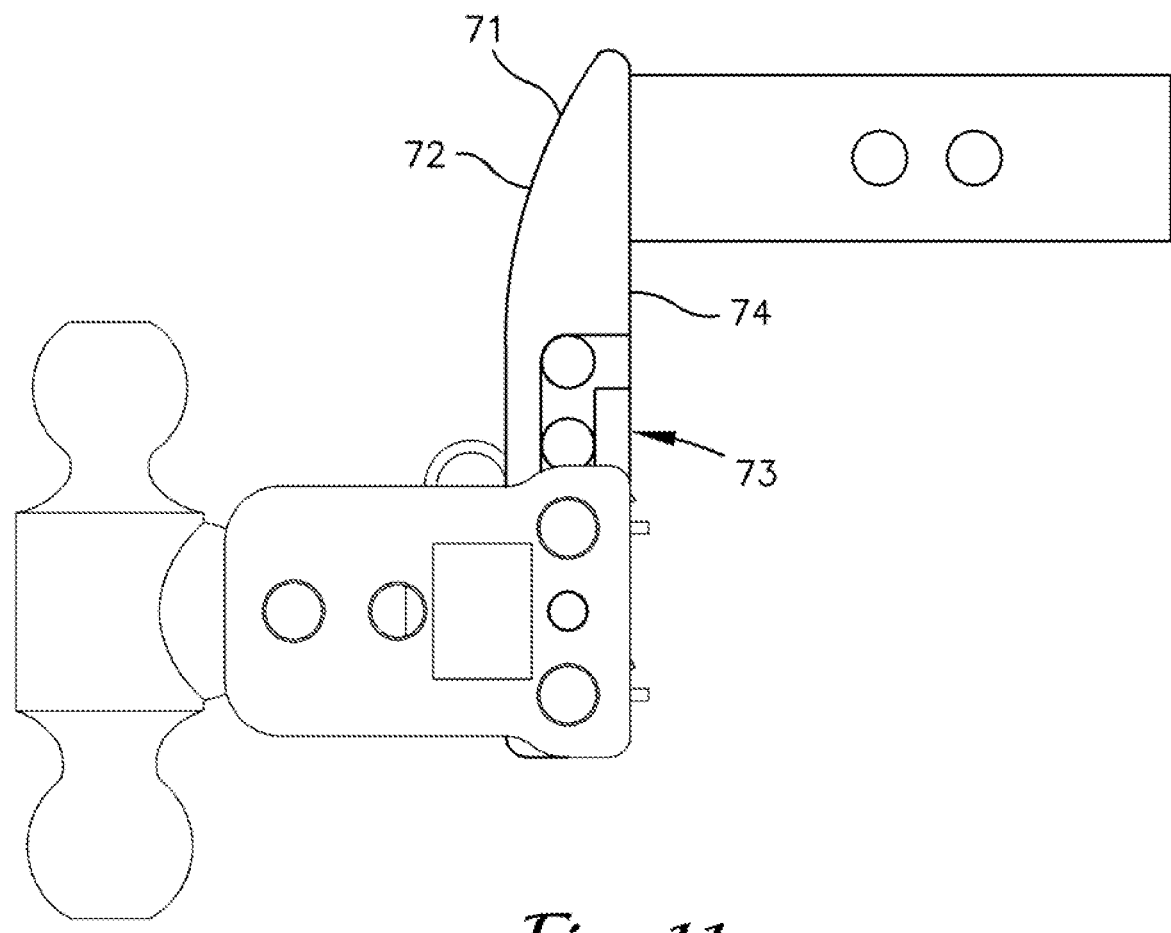
FIG. 11 is a right elevational view of a fourth alternative embodiment of the height adjustable, multi-ball hitch assembly.
Figure 12:
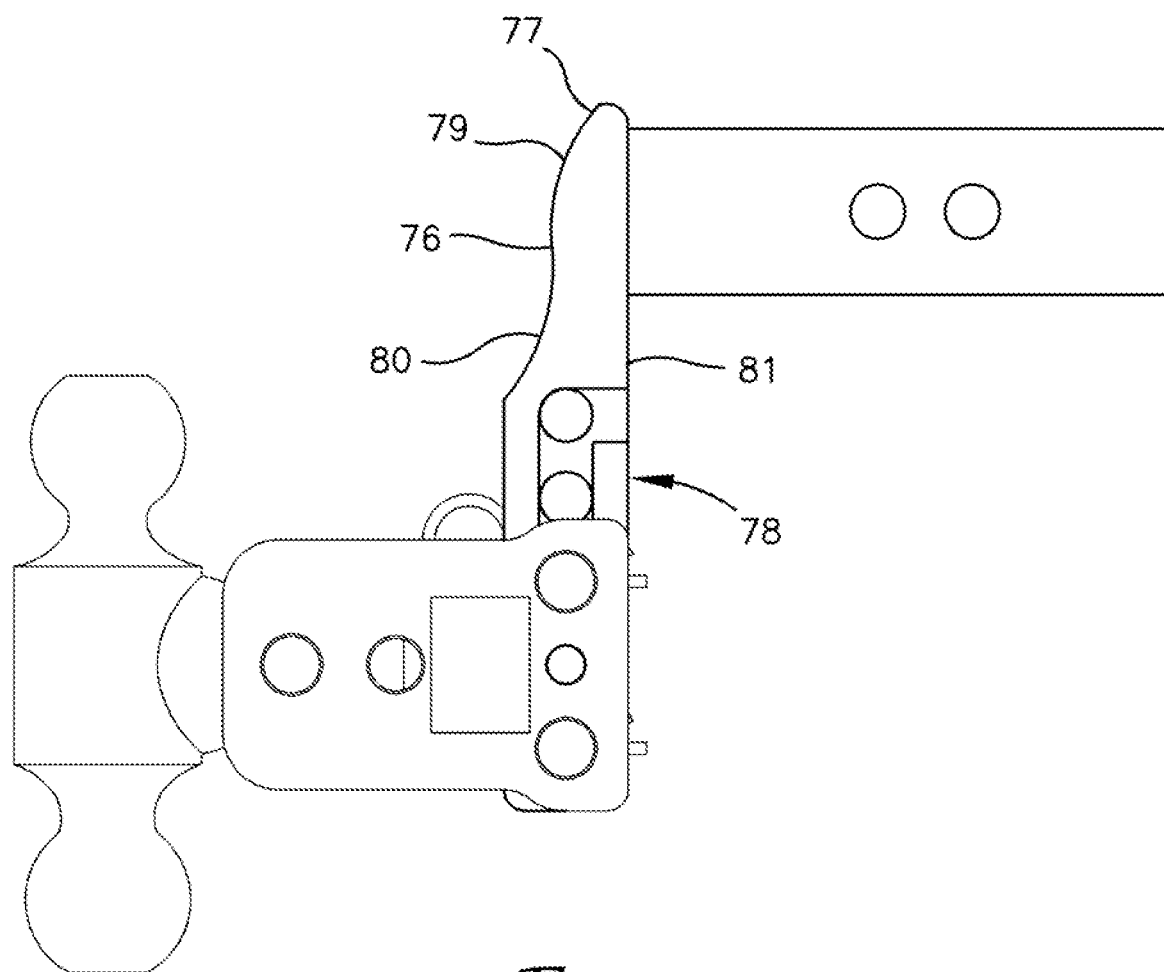
FIG. 12 is a right elevational view of a fifth alternative embodiment of the height adjustable, multi-ball hitch assembly.
Figure 13:
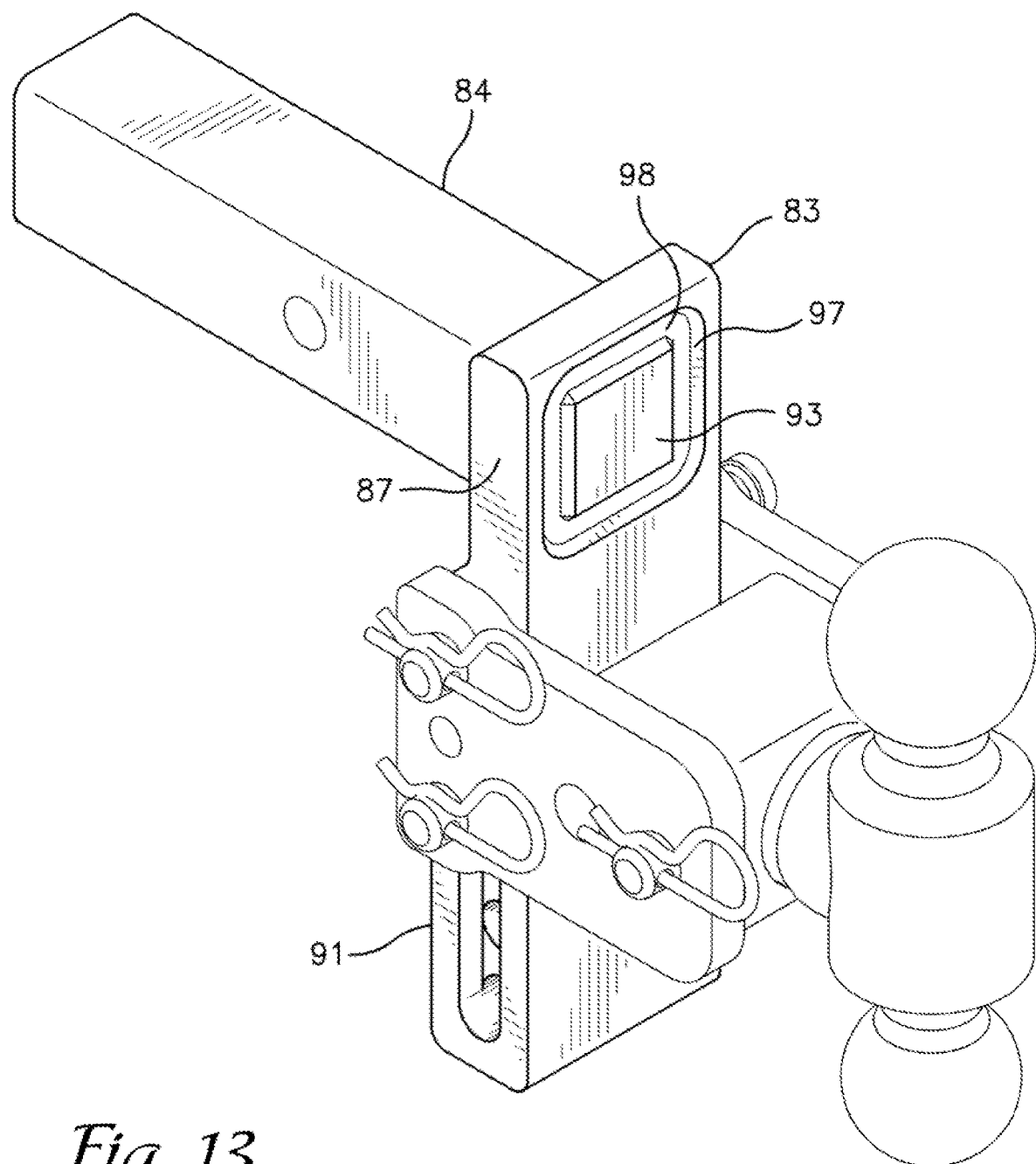
FIG. 13 is a rear, perspective view of a sixth alternative embodiment of a height adjustable, multi-ball hitch assembly.
Figure 14:
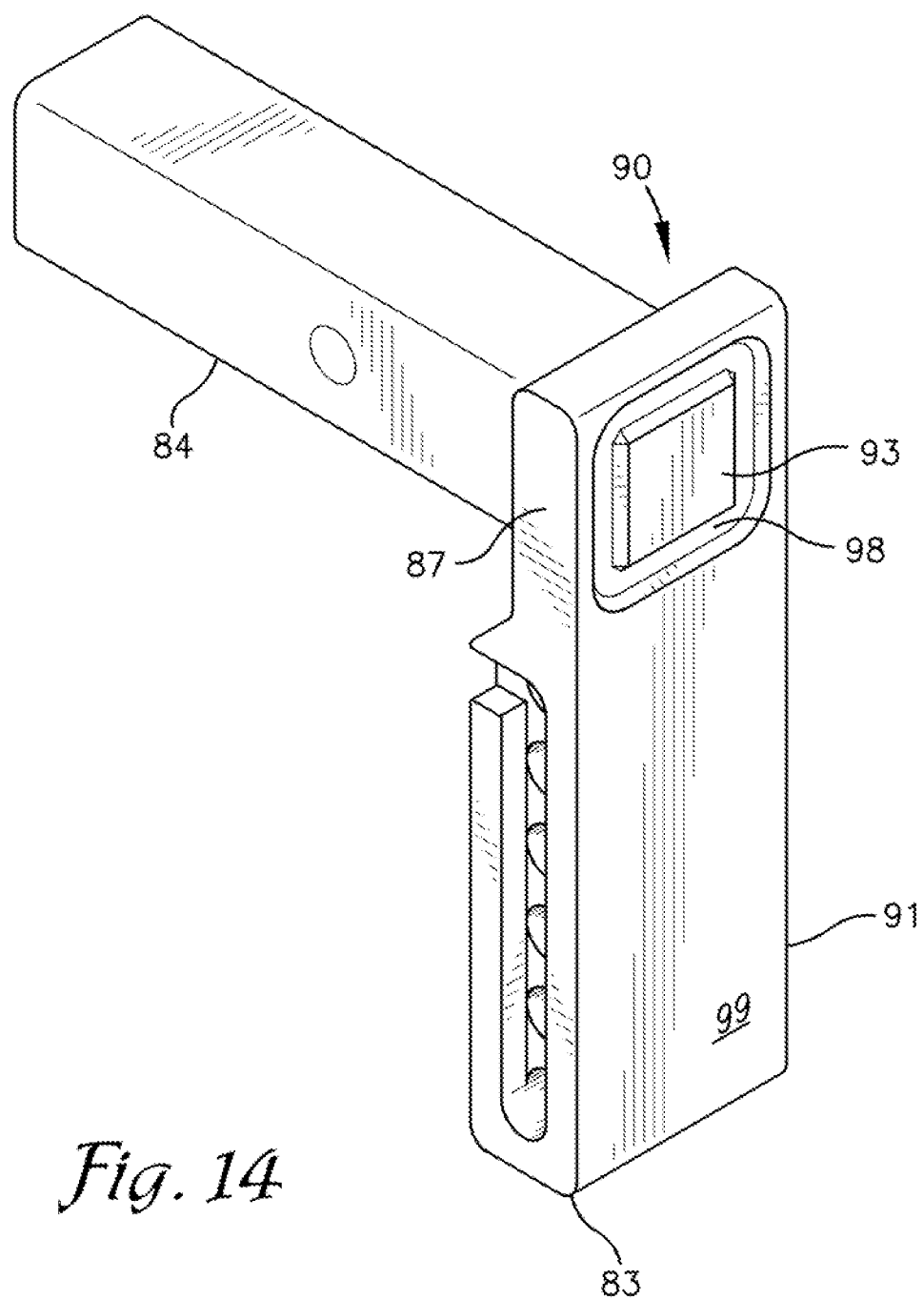
FIG. 14 is a rear, perspective view of a base of the hitch assembly as in FIG. 13 including a draw bar and a shaft.
Figure 15:
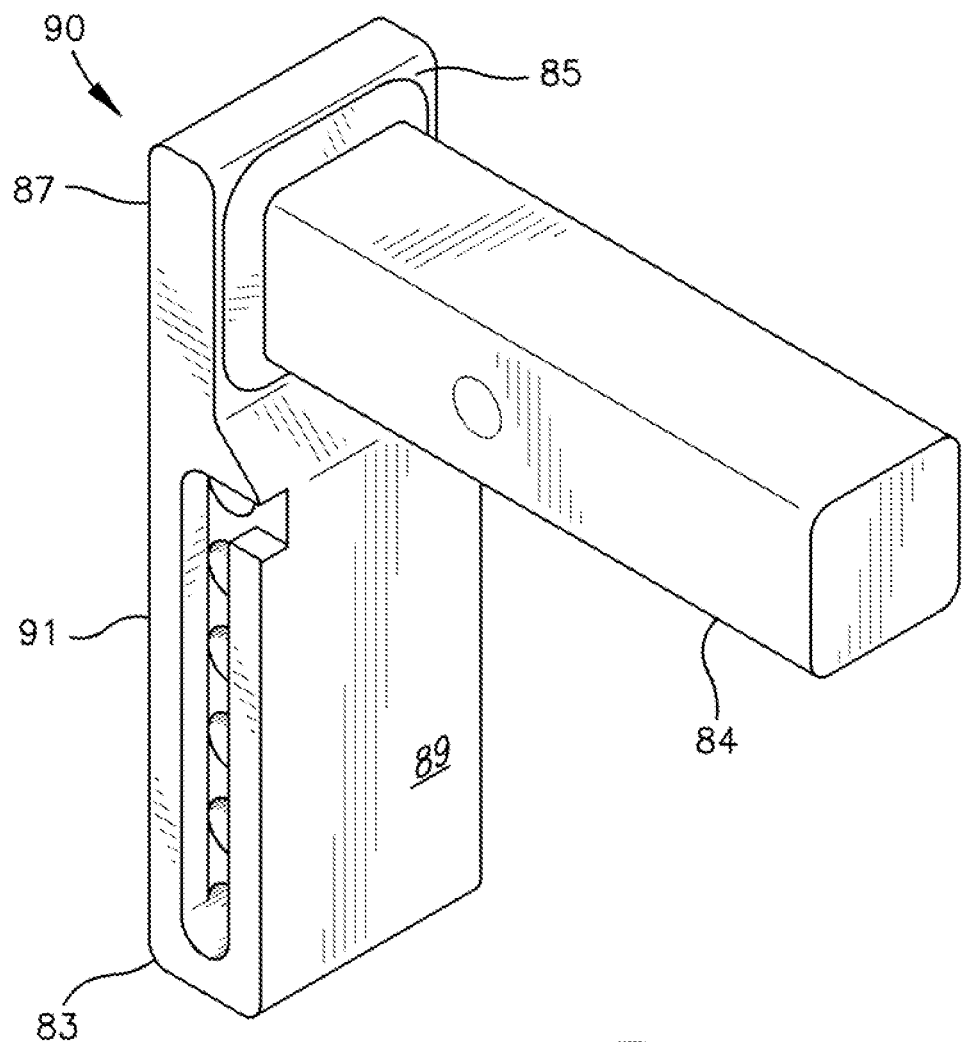
FIG. 15 is a front, perspective view of the hitch assembly base as in FIG. 14.
Figure 16:
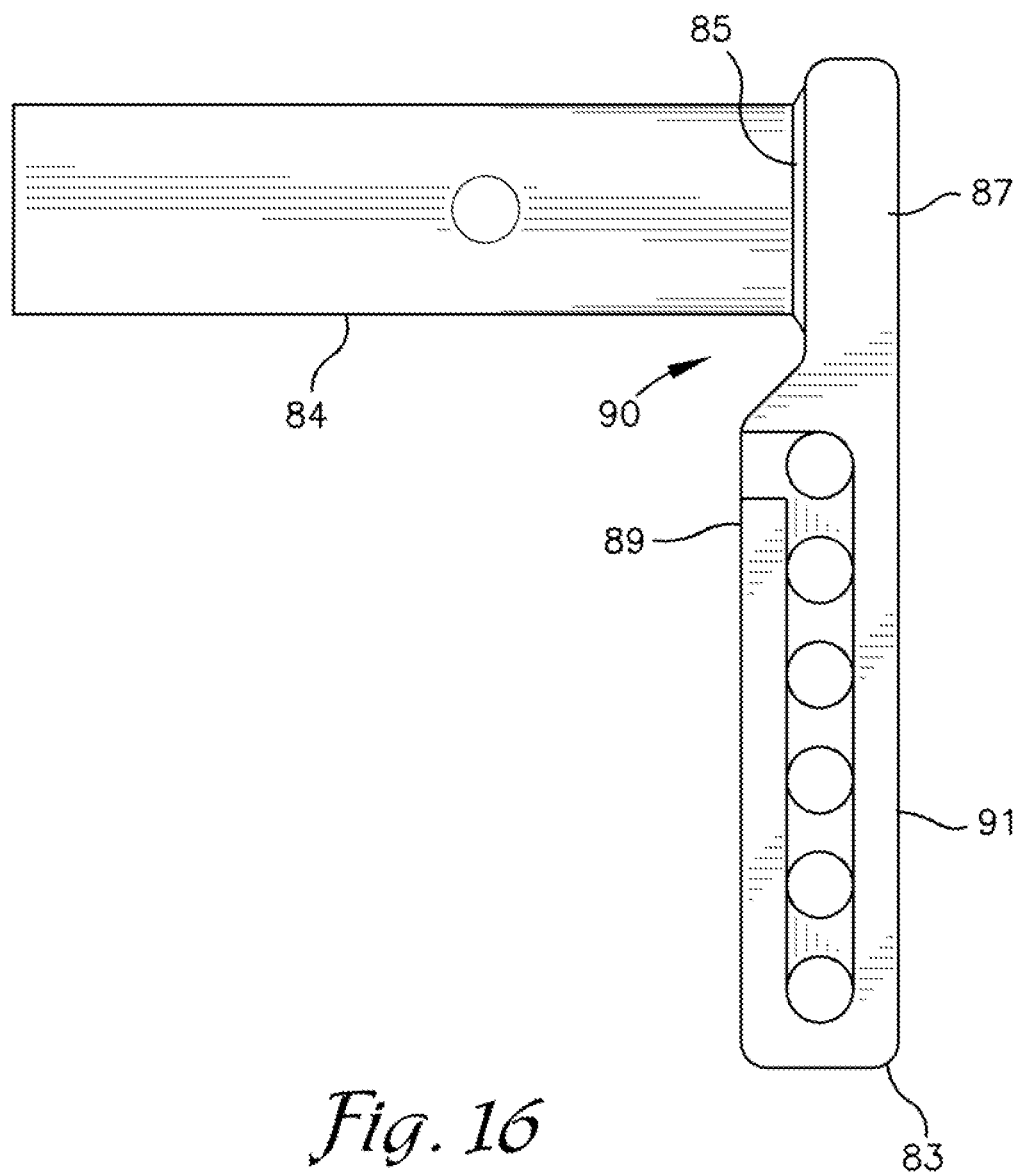
FIG. 16 is a left elevational view of the hitch assembly base as in FIG. 9.

A first alternative embodiment of the hitch assembly with a modified draw bar 43 is shown in FIGS. 5-8. The recessed geometry of an upper portion 45 of draw bar 43 is formed in two sections, an upper section 47 and a lower section 48. A rear face 51 of the upper section 47 of the upper portion 45 of the draw bar 43 extends parallel to the front face 53 thereof. The upper section 47 is thinner or narrower in profile than a lower portion 55 of the draw bar 43. A rear face 57 of the lower section 48 of the upper portion 45 of the draw bar 43 slopes rearward and downward at an acute angle, which in the embodiment shown is approximately thirty degrees relative to the front face 53 of the draw bar 43. It is foreseen that the downward and rearward slope of the rear face 57 of the lower section 48 may vary depending in part on the length of the upper section 47 and may preferably range between fifteen to forty-five degrees. Four pin receiving apertures 59 are shown formed in the lower portion 55 of draw bar 43, FIGS. 9-12 show further variations of recessing the rear face of the upper portion of the draw bar relative to the rear face of the lower portion of the draw bar. In FIG. 9, a rear face 61 of an upper portion 62 of draw bar 63 initially slopes downward and rearward at a first acute angle relative to the front face 64, then parallel relative to the front face 64 and then at a second acute angle relative to the front face 64 which in the embodiment shown is greater than the first acute angle. In the embodiment shown in FIG. 10, a rear face 66 of the upper portion 67 of draw bar 68 is formed as a concave surface opening or curving from the top of the upper portion 67 first downward and then rearward and away from the shaft toward the rear face of the lower portion. The concave rear face 66 may be described as sloping downward and away from a front face 69 of the draw bar 68. In the embodiment shown in FIG. 11, a rear face 71 of the upper portion 72 of the draw bar 73 is formed as a convex surface curving from the top of the upper portion 72 first rearward and then downward and away from the shaft toward the rear face of the lower portion. The convex rear face 71 may be described as sloping downward and away from the front face 74. In the embodiment shown in FIG. 12, a rear face 76 of the upper portion 77 of the draw bar 78 is formed as a compound curve with an upper section 79 formed convex and a lower section 80 formed concave, such that the convex upper section 79 curves from the top of the upper portion 77 first rearward and then downward and away from the shaft toward the lower section 80 and the concave lower section 80 curves from the end of the convex upper section 79, first downward and then rearward and away from the shaft toward the rear face of the lower portion. The compound curve rear face 76 may be described as sloping downward and away from the front face 81 of draw bar 78.

A further alternative embodiment of the hitch assembly with a modified draw bar 83 connected to shaft 84 is shown in FIGS. 13-18. A front face 85 of an upper portion 87 of draw bar 83 is recessed rearward relative to a front face 89 of a lower portion 91 of the draw bar 83 so that the upper portion 87 is thinner than the lower portion 91. The front face 89 of the lower portion 91 of the draw bar 83 extends inward, under the shaft 84 relative to the front face 85 of the upper portion 87 of the draw bar 83.

Figure 17:
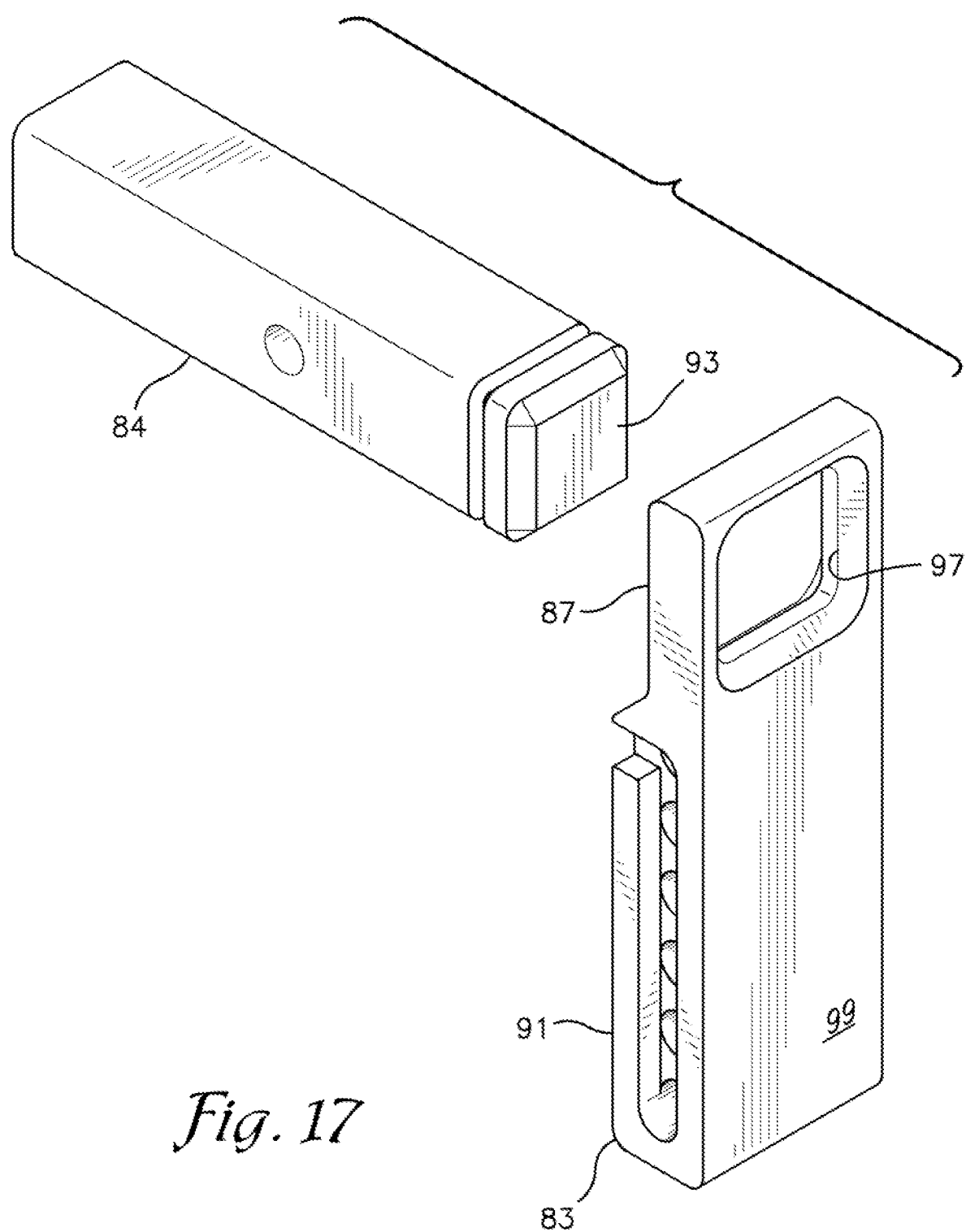
FIG. 17 is an exploded, rear perspective view of the draw bar and shaft as in FIG. 14.
Figure 18:
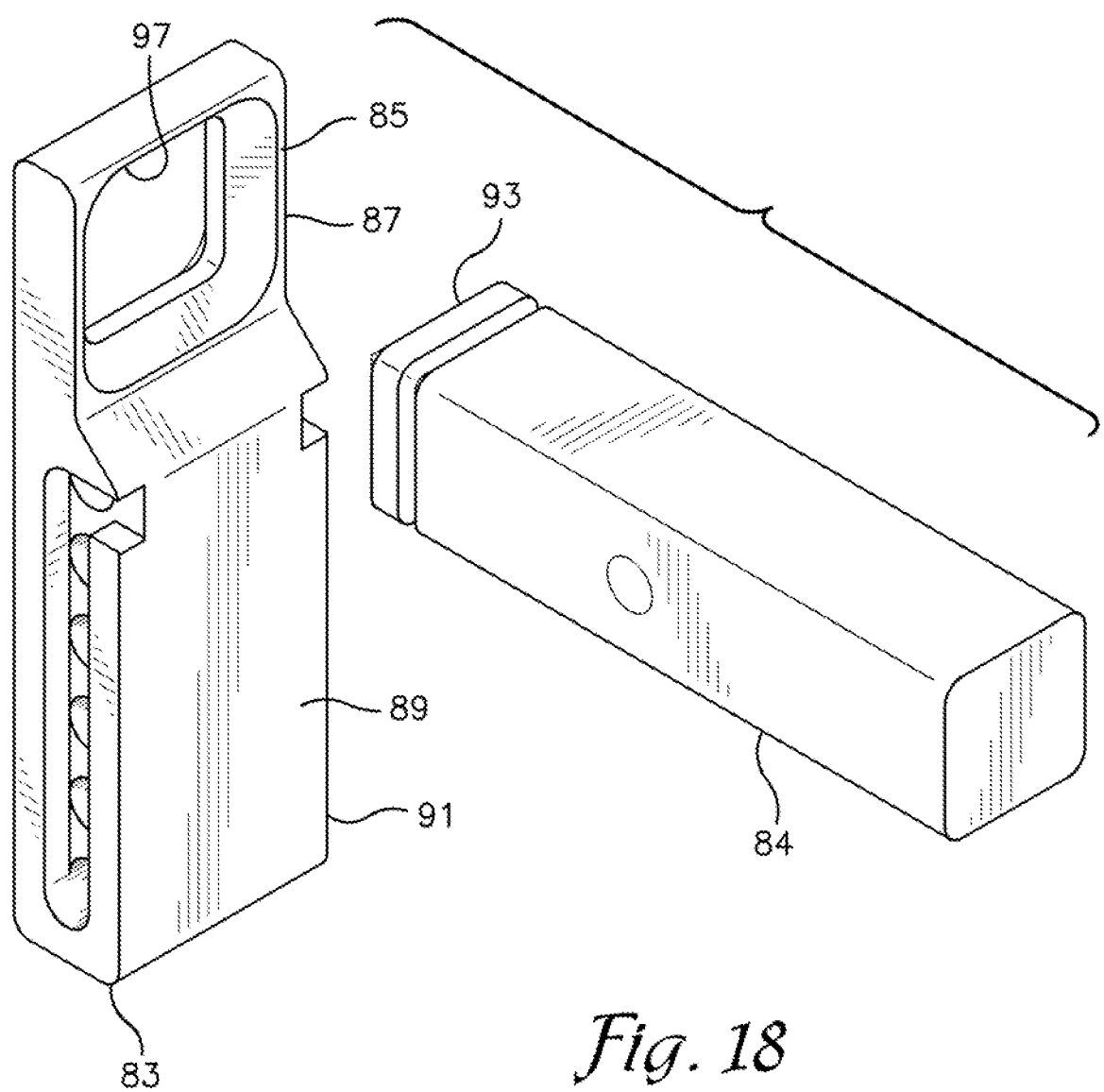
FIG. 18 is an exploded, front perspective view of the draw bar and shaft as in FIG. 14.

As shown in FIGS. 17 and 18, the hitch bar 90 may be formed by inserting an inner end 93 of the shaft 87 of the hitch assembly into a square hole 97 formed through the upper portion 87 of the draw bar 83 and then welding the components together. Although not shown in the drawings, sufficient material can be used in forming weld 98 so that the outer surface of the weld 98 may be formed or ground down to extend flush with a rear face 99 of the draw bar 83 so that the rear face 99 is generally flat and extends approximately parallel to the front face 89 of both the upper and lower portions 87 and 91 except for a transition therebetween.

Figure 20:
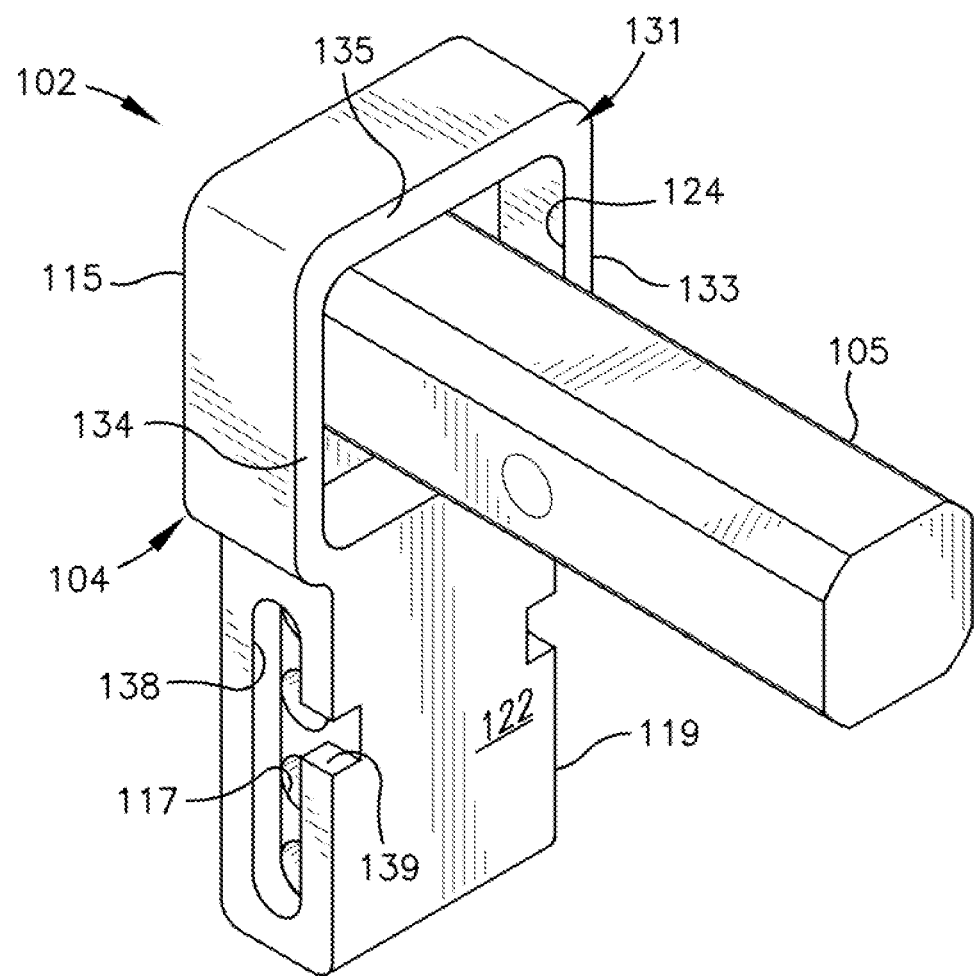
FIG. 20 is a front, perspective view of the hitch assembly base as in FIG. 19.
Figure 21:
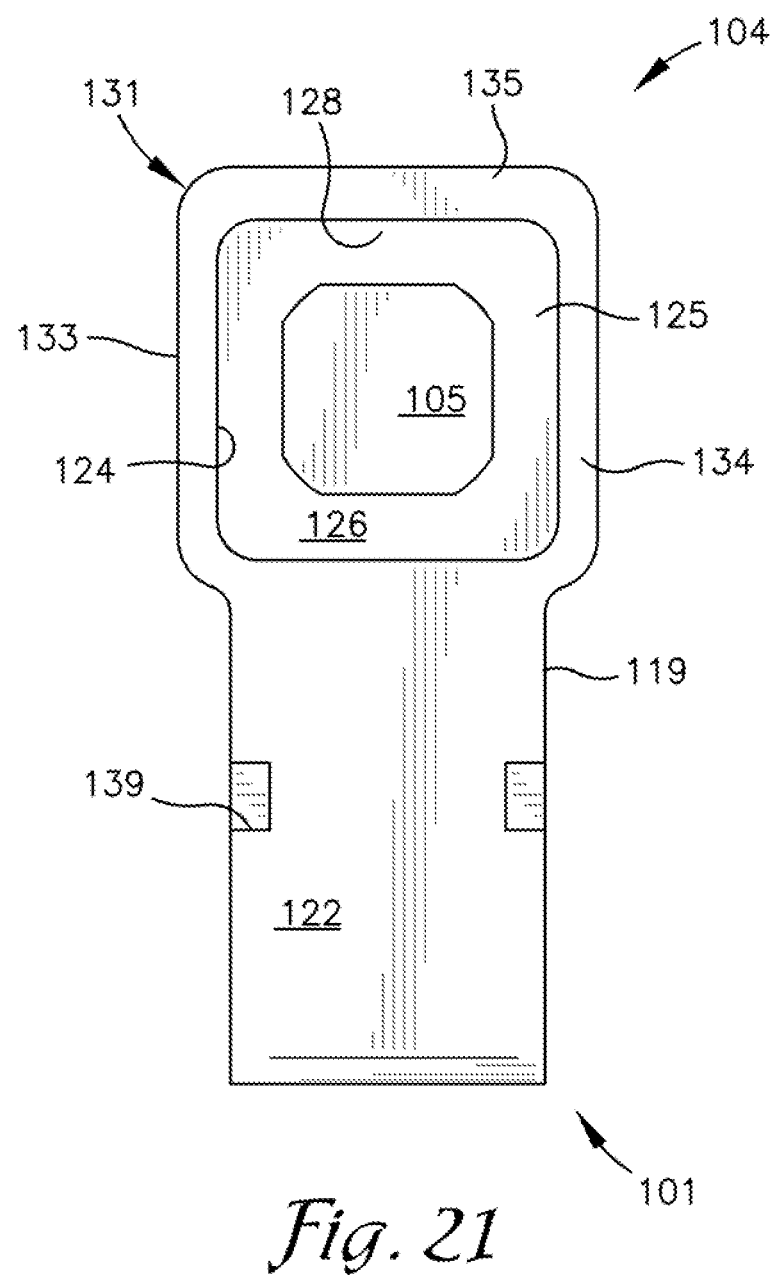
FIG. 21 is a front view of the hitch assembly base as in FIG. 19.
Figure 22:
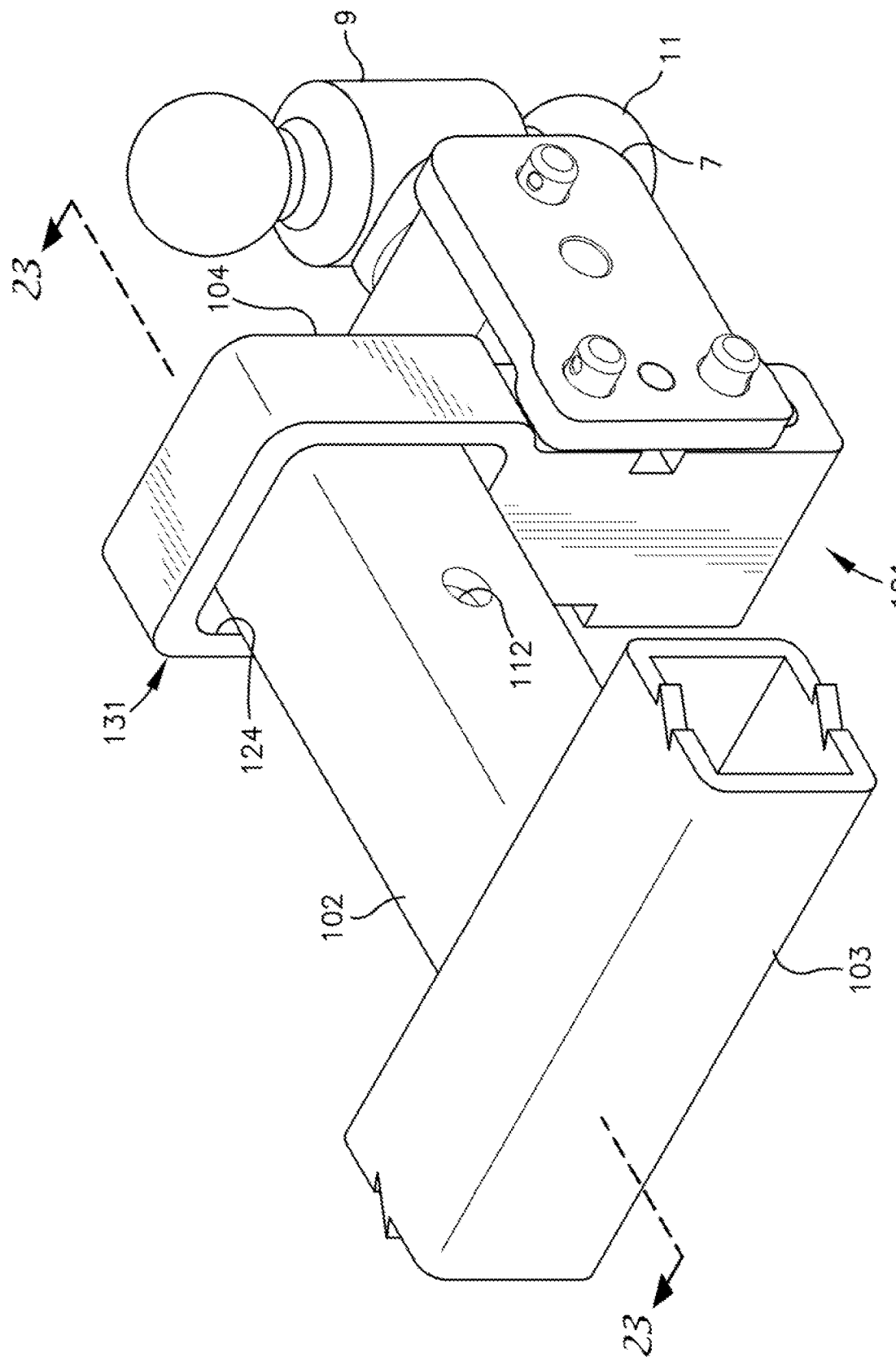
FIG. 22 is a fragmentary, rear perspective view of the multi-ball hitch assembly as in FIG. 19 secured within a hitch receiver.
Figure 23:
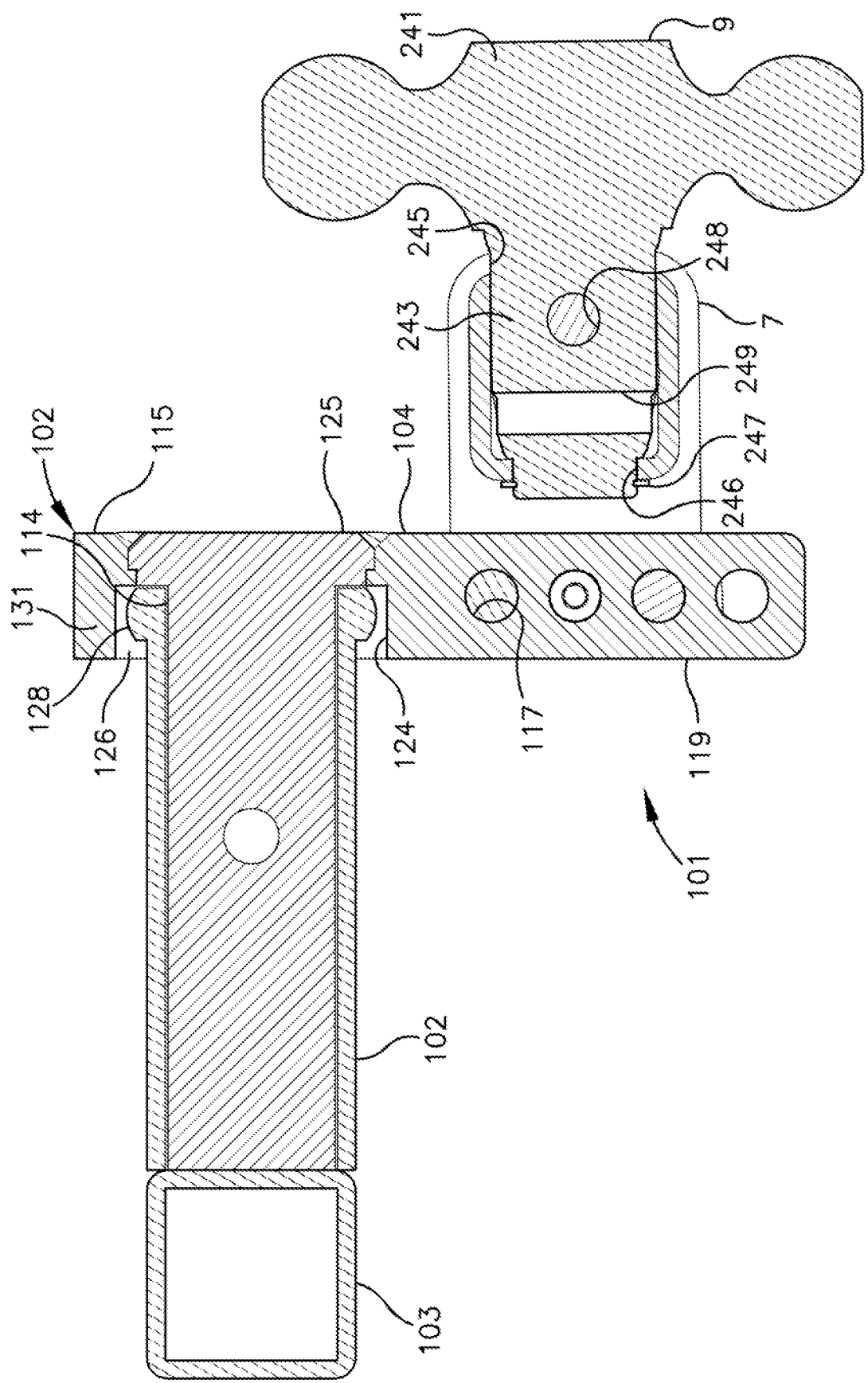
FIG. 23 is a cross-sectional view of the multi-ball hitch assembly secured within the hitch receiver taken along line 23-23 of FIG. 22.

FIGS. 19-23 show a hitch assembly 101 with an alternative hitch base 102. In FIGS. 22 and 23, the alternative hitch base 102 is shown secured within a square tube receiver 2 of a hitch mounting assembly 103 connected to a vehicle (not shown) so that the receiver 2 extends below the rear bumper of the vehicle. The hitch base 102 includes a draw bar or drop bar 104 connected to a shaft or trunnion 105, a hitch ball mount 7 securable to the draw bar 104 at a selected relative height and a hitch ball assembly 9 rotatably supported on the hitch ball mount 7 to allow a user to selectively position one of a plurality of hitch balls 11 in position to connect to a hitch ball coupler on a trailer (not shown). As used herein, directional references are generally with reference to the orientation of a towing vehicle to which the hitch assembly 101 is attached. In FIG. 23, the front of the hitch assembly 101 is to the left on the page and the rear of the hitch assembly is to the right of the page.

The shaft 105 of the hitch base 102 is approximately square in cross-section and sized to fit snugly within a tube forming the square tube receiver 2 with which the hitch assembly is adapted for use. Common sizes of the internal dimensions of such tubes are 2 inches by 2 inches or 2½ inches by 2½ inches. A pin receiving aperture 111 is formed through the shaft 105 at a point selected to align with a hole 112 extending through the sidewall of the receiver 2 to permit a pin (not shown) to be inserted through the holes in the receiver and the aligned pin receiving aperture 111 in the hitch shaft 105 to secure the hitch assembly 101 in the receiver 2.

The draw bar 104 is formed from an elongate block. A first or inner end 114 of the shaft 105 is connected to a first or upper portion 115 of the draw bar 104 with the shaft extending transverse to and forward from the upper portion 115 of the draw bar 104. The draw bar 104 includes a plurality of pin receiving apertures 117 extending laterally through a second or lower portion 119 of the draw bar 4 in vertically spaced alignment along the lower portion 119 of the draw bar 4. Four pin receiving apertures 117 are shown in the draw bar 104 of FIGS. 19-23. The draw bar 104 is shown in FIGS. 19-23 in a commonly used orientation in which the lower portion 119 of the draw bar 104 extends below the shaft 105 and below the receiver 2 in which the shaft 105 is secured. It is contemplated however, that in some circumstances, the orientation of the draw bar 104 will be reversed so that the lower portion 119 extends above the shaft 105 and receiver 2. As used herein, reference to the first and second portions 115 and 119 of the draw bar 104 as the upper and lower portions 115 and 119 is with respect to the more common orientation as shown in FIGS. 19-23.

The upper portion 115 of the draw bar 104 has a recessed geometry relative to the lower portion 119. A rear face 121 and front face 122 of the draw bar 104 are planar and extend generally parallel to each other. A recess 124 is formed in the front face 122 of the upper portion 115 of the block forming the draw bar 104 and extends rearwards into the block forming the draw bar 104. In the embodiment shown, the recess 124 is approximately square in cross section with rounded corners. The thinner section of material forming the upper portion 115 of the draw bar 104 rearward of the recess 124 may be referred to as a web 125. The shaft 105 is mounted to the draw bar 104, centrally within the recess 124, and extends forward relative to the web 125. A forward-facing surface of the web 125 surrounding the shaft 105 may be referred to as a receiver abutment surface 126. The vertical and horizontal width of the recess 124 are sufficient to form a gap 128 between the shaft 105 and the upper portion 115 of the block forming the draw bar 104 which is wide enough to receive the distal end 128 of the square tube receiver 2 therein. In the embodiment shown, the recess 124 extends into the block forming the draw bar 104 approximately two-thirds the thickness of the block. It is foreseen that the recess 124 might extend into the block forming the draw bar 104 between approximately one-third to two-thirds the thickness of the block. When the shaft 105 of the hitch base 102 is inserted into the receiver 2, the hitch base 102 can be slid forward until the distal end 128 of the receiver 2 extends into the recess 124 and abuts against the receiver abutment surface 126 which functions as a stop or stop surface. In the embodiment shown, approximately two thirds of the draw bar 104 extends forward of the distal end 128 of the receiver 2.

Figure 46:
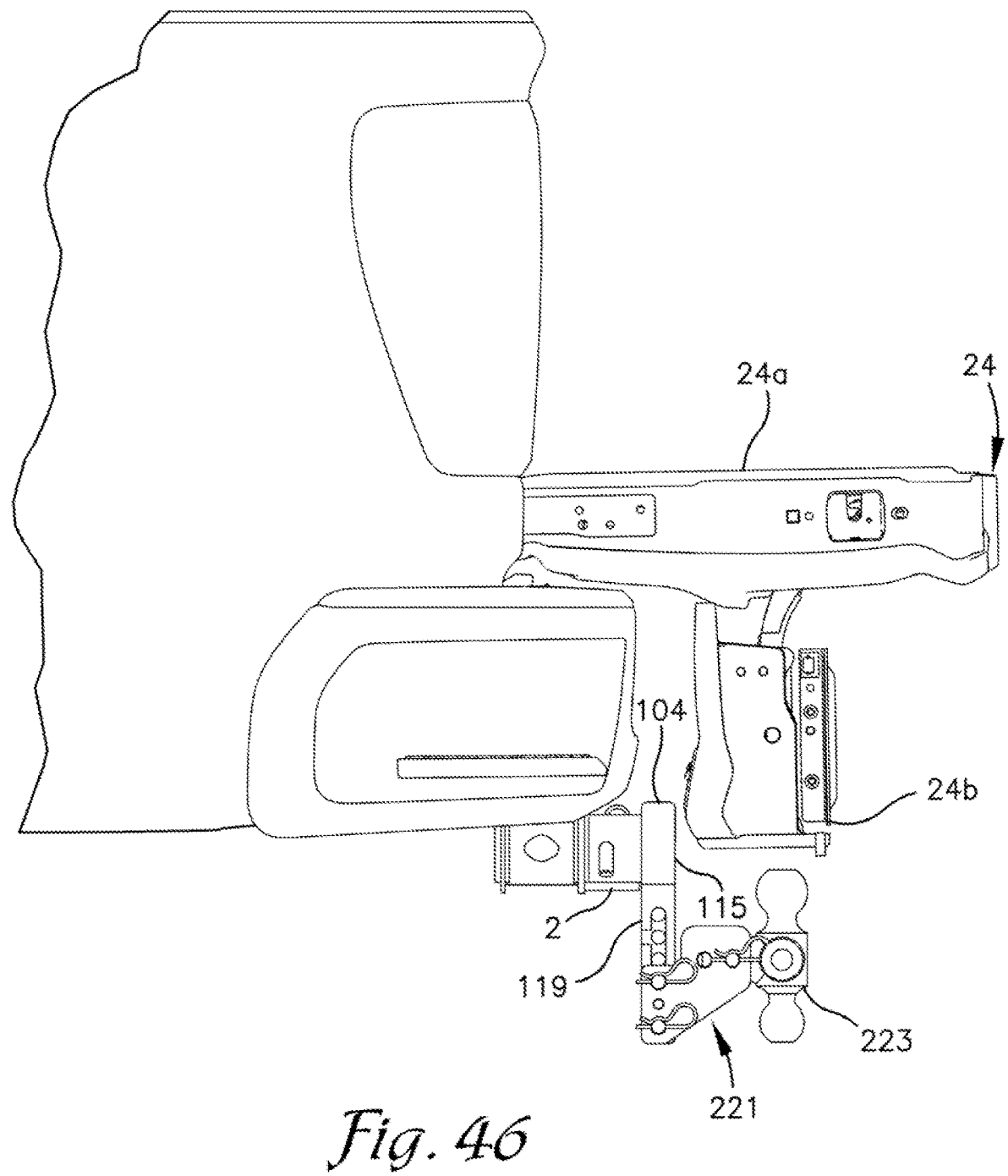
FIG. 46 is a fragmentary side, elevational view of the hitch assembly of FIG. 42 secured within a hitch receiver mounted on a pickup truck with a MultiPro tailgate assembly shown in a lowered configuration.

In one embodiment, the block forming the draw bar 104 may be one-and-one half inches thick and the recess 124 extends into the draw bar 104 approximately one inch with the web 125 being one half inch thick. With shaft 105 inserted in receiver 2 and receiver abutment surface 126 abutting a distal end 128 of receiver 2, the thickness of both the upper portion 115 and lower portion 119 of the draw bar 104 extending rearward of the receiver distal end 128 is approximately one half inch, and therefore thin enough, so that the upper portion 115 does not interfere with tailgate section 24b of the MultiPro tailgate 24 in a lowered position as generally shown in FIG. 46.

As best seen in FIGS. 20 and 21, a flange wall 131 surrounds the recess 124 along the sides and the top of the upper portion 115 of the draw bar 104 and includes first and second side flanges 133 and 134 and top flange 135. The flanges may also be referred to as reinforcing ribs. The first and second side flanges 133 and 134 extend continuous with the top flange 135 and with the portion of the block forming the draw bar 104 extending adjacent and below a lower edge of the recess 124 with the lower portion 119 of the draw bar 104 extending therebelow. The flange wall 131 is generally of uniform thickness and a front face of the flange wall 131 comprises part of the front face 122 of the block forming the draw bar 104. The side flanges 133 and 134 resist cracking or separation of the upper portion of the draw bar 104 from the shaft 105. The connection of the side flanges 133 and 134 to the top flange 135 and the portion of the block forming the draw bar 104 below the lower edge of the recess 124 provides additional strength to the hitch base 102.

A guide slot or channel 138 is formed in each side of the draw bar 104 and extends across and in alignment with the pin receiving apertures 117 in the draw bar 104. Each guide slot 138 includes an access leg 139 extending or opening to the front face 122 of the draw bar 104. Each guide slot 138 is sized to receive one of the guide pins 28 projecting inward from the opposed mounting flanges 31 and 32 of the hitch ball mount 7 described previously. With the guide pins 28 extending in the guide slots 138, securement pins 39 are insertable through aligned sets of pin receiving holes 37 in the mounting flanges 31 and 32 and pin receiving apertures 117 in the draw bar 104 to secure the hitch ball mount 7 to the draw bar 104 at a selected height. In the embodiment shown, the four sets of vertically spaced pin receiving apertures 117 allows securement of the hitch ball mount 7 in one of two vertical positions relative to the draw bar 104.

The hitch ball mount 7 may be pinned to the draw bar 104 to extend rearward of the draw bar 104 in a towing position or may be pinned to the draw bar 104 to extend forward of the draw bar 104 and under the shaft 105 in a stowed position. The guide pins 28 received in respective guide slots 138 maintain the hitch ball mount 7 connected to the draw bar 104 when the securement pins 39 are removed and allow the hitch ball mount 7 to be pivoted between the towing and stowed positions. Thereafter, the securement pins 39 can be reinserted in aligned sets of pin receiving holes 37 in mounting flanges 31 and 32 and pin receiving apertures 117 in draw bar 104.

In the embodiment shown, the hitch ball assembly 9 includes two different sized hitch balls 11. It is foreseen that the hitch ball assembly could include three or four different sized hitch balls or just one hitch ball. The construction of the hitch ball mount 7 and the hitch ball assembly 9 to permit rotation of the hitch ball assembly 9 relative to the mount 7 and pinning it in the selected orientation may be similar to that shown in U.S. Pat. No. 7,125,036 which is incorporated herein by reference.

Figure 24:
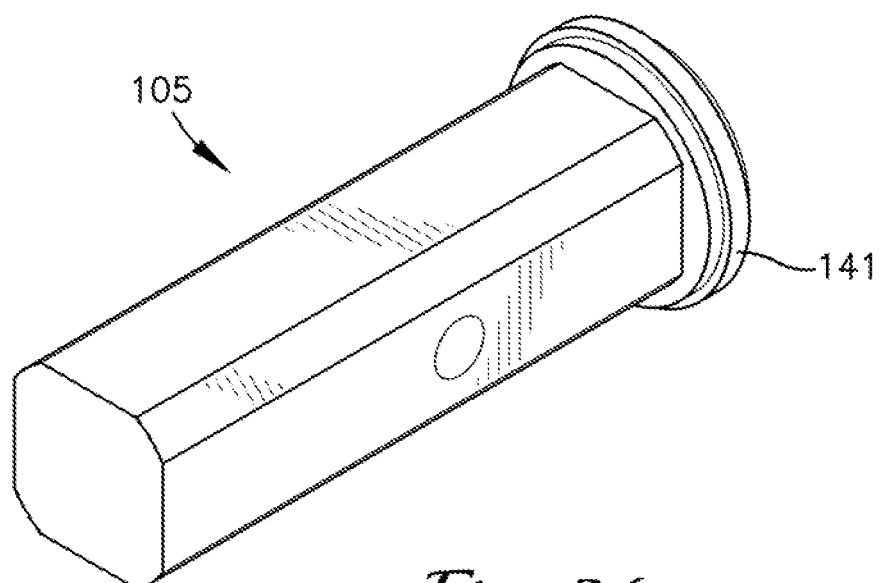
FIG. 24 is a front perspective view of the shaft prior to welding to the draw bar.
Figure 25:
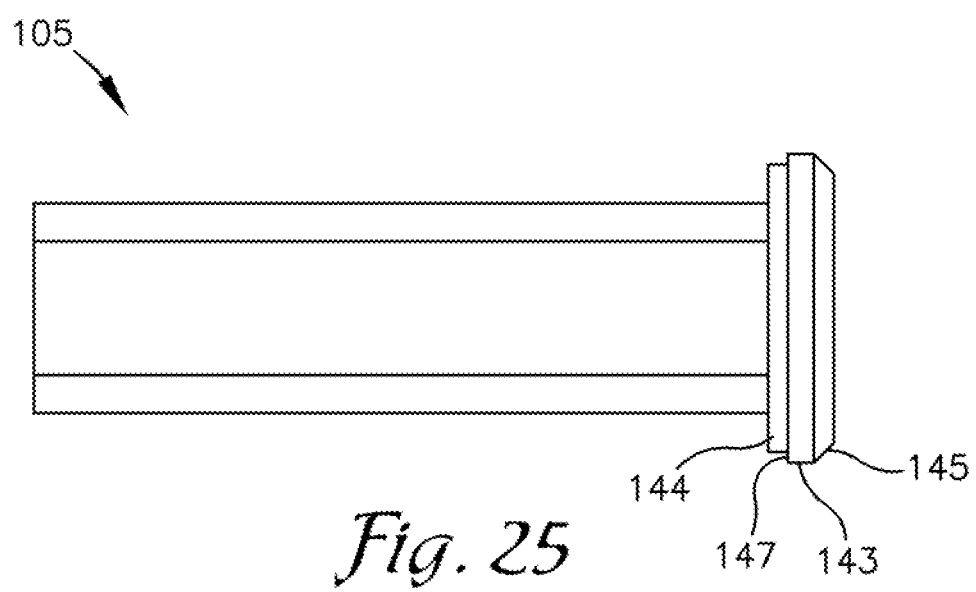
FIG. 25 is a left, side elevational view of the shaft.

Referring to FIGS. 24-28, components for forming the hitch base 102 are shown. The shaft 105 is formed separate from the draw bar 104 and welded thereto. The shaft 105, before it is welded to the draw bar 104, is shown in FIGS. 24 and 25. An enlarged and cylindrical head 141 is formed on one end of the shaft 105. The head 141 includes a cylindrical center section 143, a reduced diameter, cylindrical neck 144 connected to the inner end 128 of the shaft 105 and an inwardly sloped distal end 145. A shoulder 147 is formed between the neck 144 and center section 143.

Figure 26:
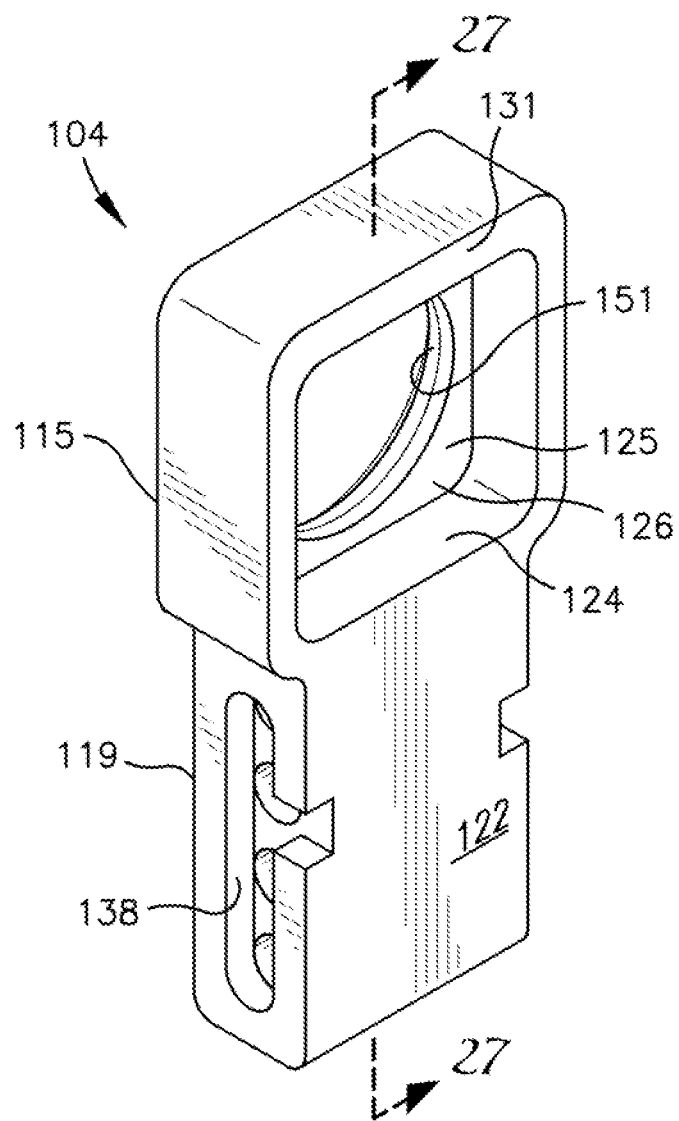
FIG. 26 is a front perspective view of the draw bar prior to welding the shaft thereto.
Figure 27:
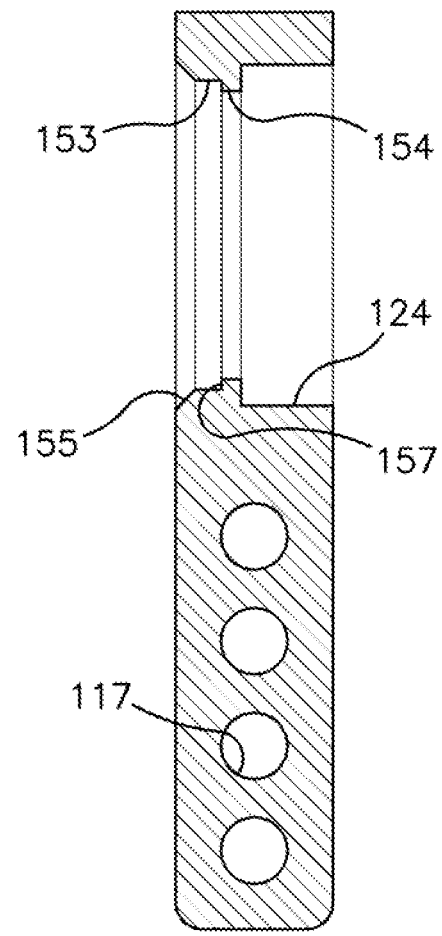
FIG. 27 is a cross-sectional view taken along line 27-27 of FIG. 26.
Figures 30, 31:
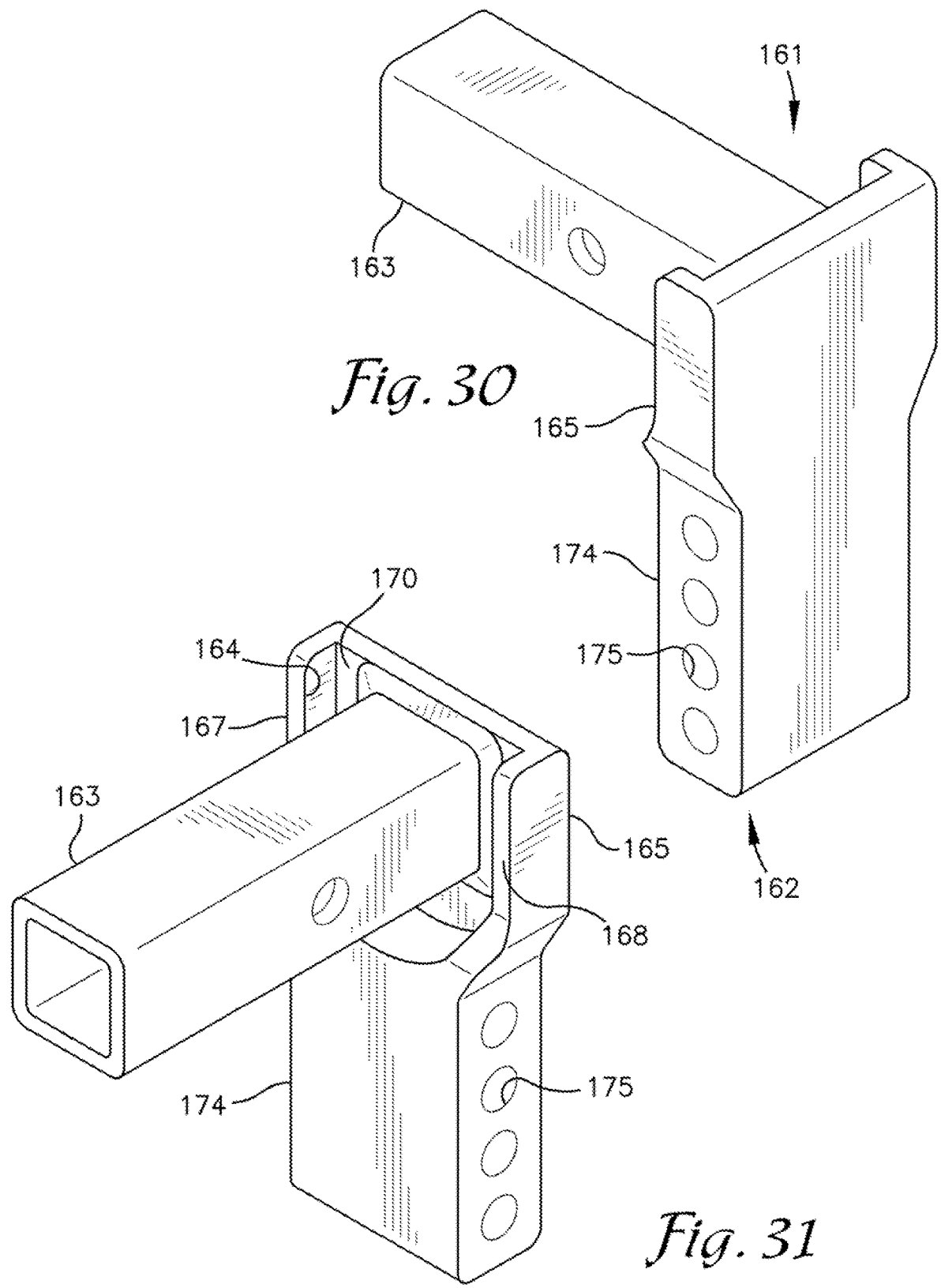
FIG. 30 is a rear, perspective view of an eighth alternative of a hitch assembly base including draw bar and shaft for use with a height adjustable, multi-ball hitch assembly.
FIG. 31 is a front, perspective view of the hitch assembly base as in FIG. 30.
Figures 32, 33:
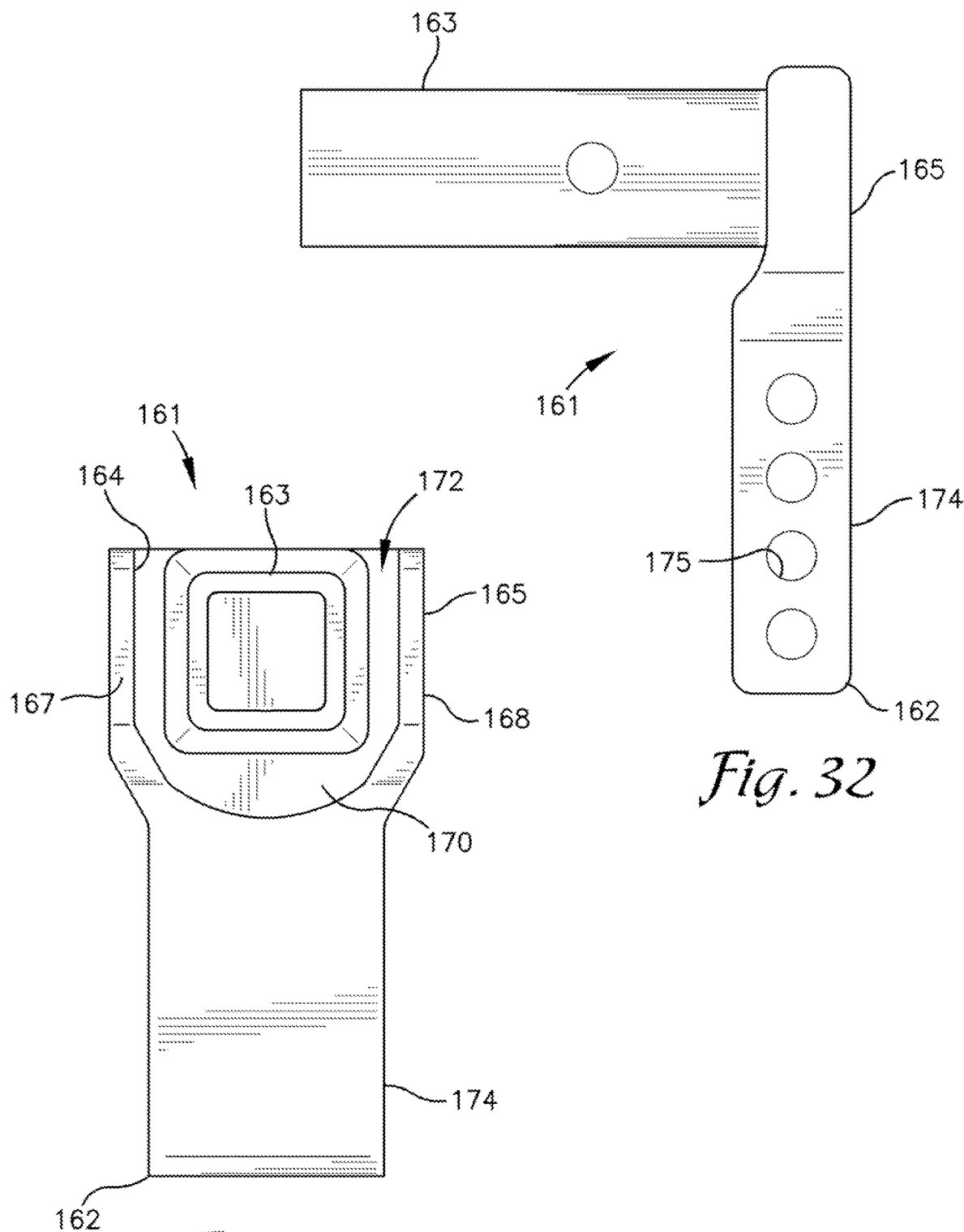
FIG. 32 is a left elevational view of the hitch assembly base as in FIG. 30.
FIG. 33 is a front view of the hitch assembly base as in FIG. 30.
Figures 34, 35:
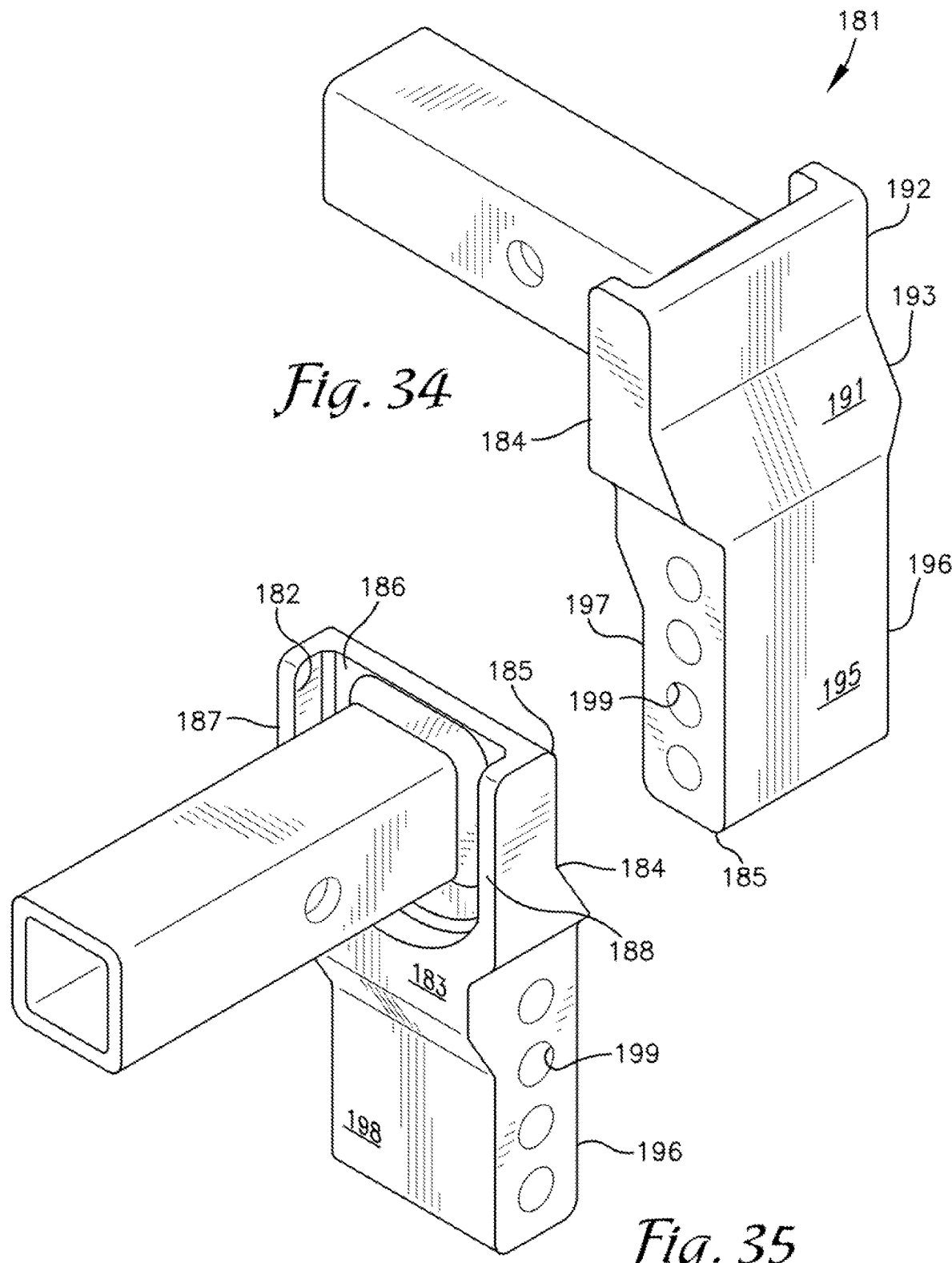
FIG. 34 is a rear, perspective view of a ninth alternative embodiment of a hitch assembly base comprising a draw bar and shaft for use with a height adjustable, multi-ball hitch assembly.
FIG. 35 is a front, perspective view of the hitch assembly base as in FIG. 34.
Figures 36, 37:
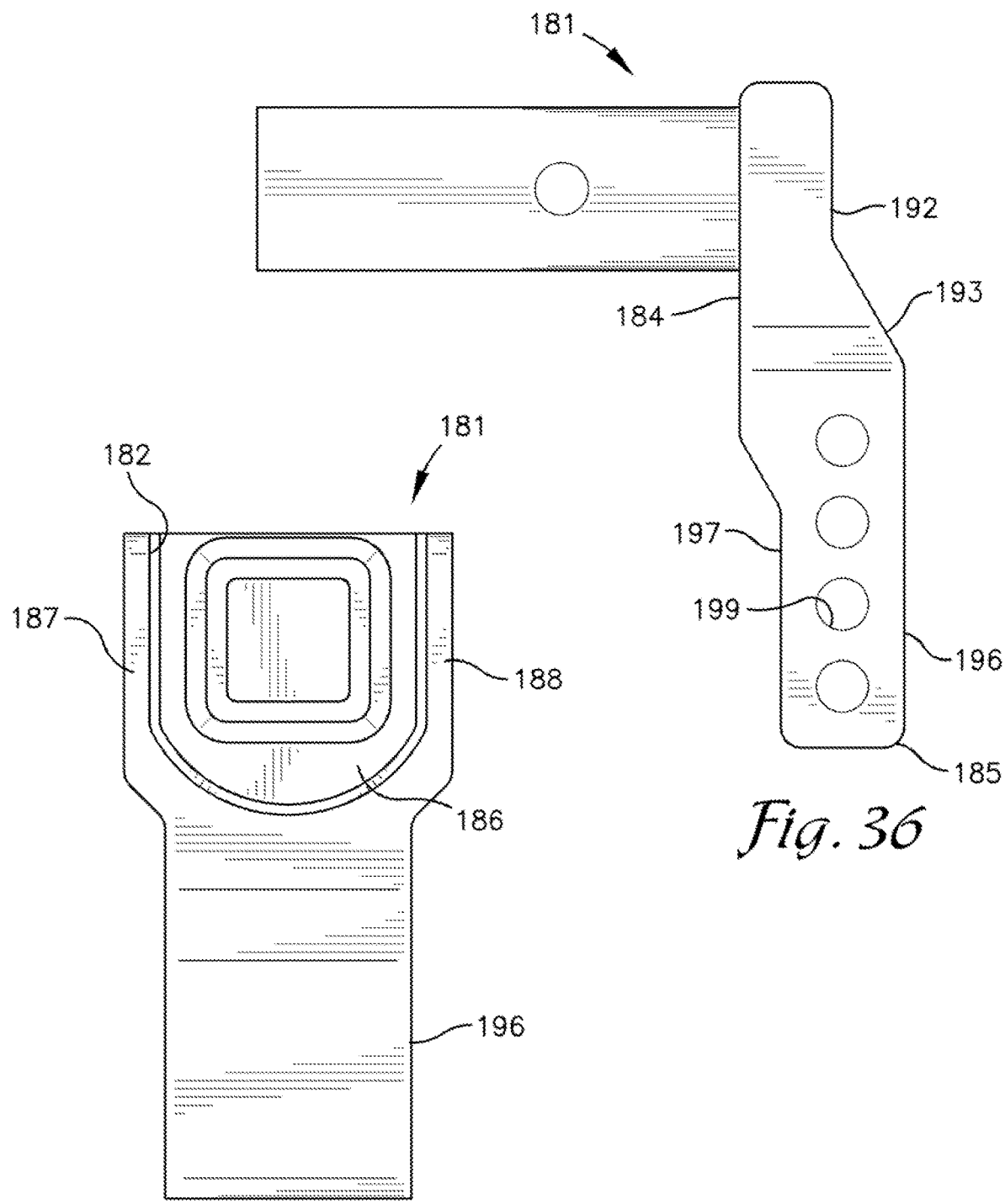
FIG. 36 is a left elevational view of the hitch assembly base as in FIG. 34.
FIG. 37 is a front view of the hitch assembly base as in FIG. 34.
Figures 40, 41:
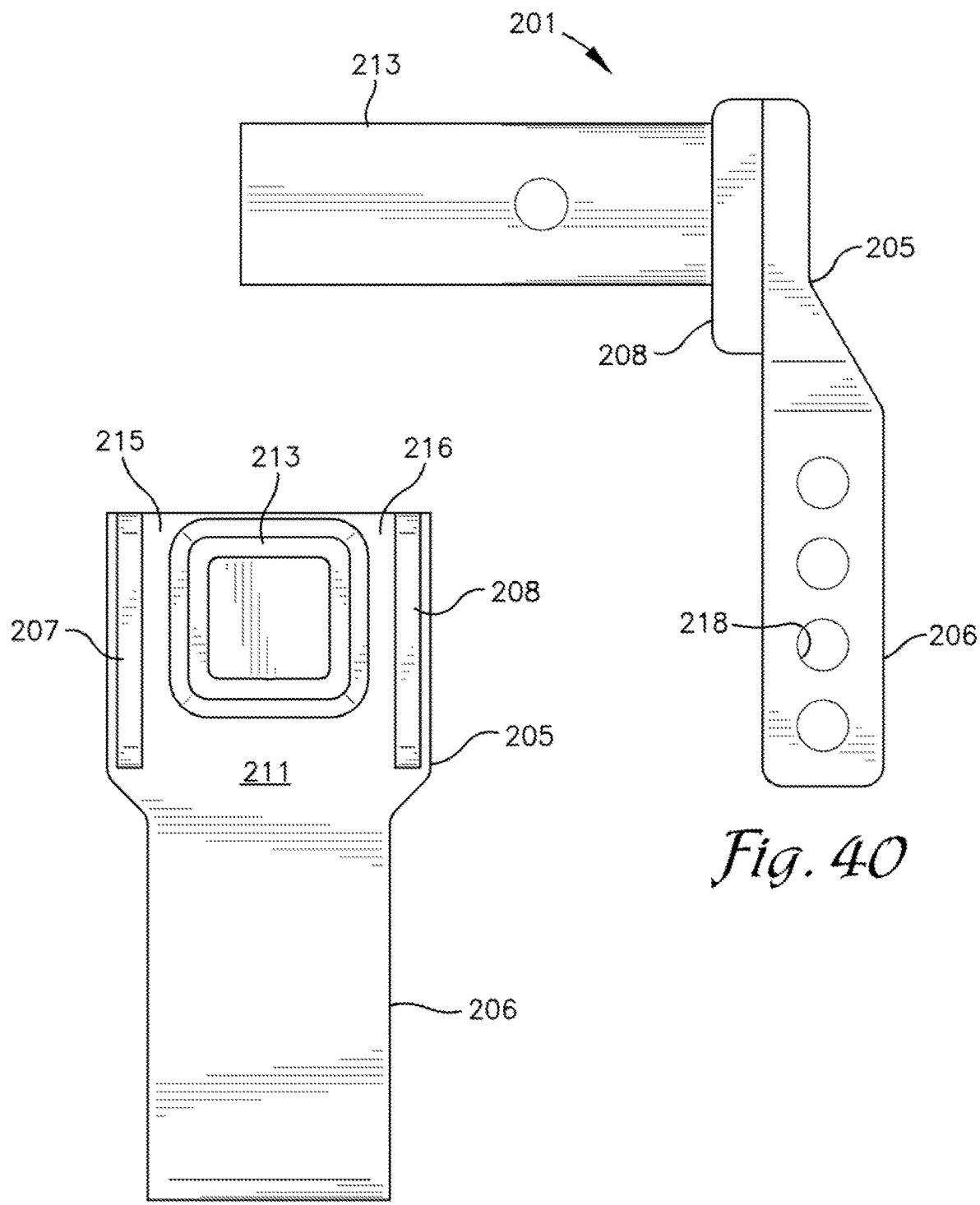
FIG. 40 is a left elevational view of the hitch assembly base as in FIG. 38.
FIG. 41 is a front view of the hitch assembly base as in FIG. 38.

Referring to FIGS. 26 and 27, a weldment hole 151 is formed in the web 125 of the upper portion 115 of the draw bar 104 and extends from the rear face 121 of the draw bar 104 through the web 125 and opens into the recess 124. The weldment hole 151 is centered relative to recess 124 and web 125 and is slightly smaller in diameter than the width and height of the recess 124 and the web 125. The geometry of the edge of the weldment hole 151 generally matches the geometry of the circumferential surfaces of the enlarged head 141 on shaft 105 and is slightly larger in diameter than the corresponding surfaces of the enlarged head 141. The edge of the web 125 surrounding the weldment hole 151 includes a center section 153, a reduced diameter neck section 154 extending inward of the center section 153 and an outwardly sloping section 155 extending rearward of the center section 153. A shoulder 157 is formed between the neck section 154 and the center section 153.

The enlarged head 141 is matingly secured within the weldment hole 151 by inserting the end of the shaft 105, opposite the head 141, forwardly through the weldment hole 151 until the head 141 extends in mating relationship with the web 125 of the draw bar 104 within the weldment hole 151 as shown in FIG. 28. Abutment of shoulder 147 on head 141 against shoulder 157 formed in the web 125 and projecting into the weldment hole 151 prevents the head 141 from being pulled completely through the weldment hole 151. A V-shaped groove 159 is formed between the sloped distal end 145 of the head 141 and the outwardly sloped surface 155 of the web 125 around the weldment hole 151. The V-shaped groove 159 receives weld filler during the welding process to form a weld between the head 141 and web 125 for securing the shaft 105 to the draw bar 104. The weld may be ground or otherwise finished so that the rear face 121 of the draw bar 104 is generally flat.

FIG. 29 shows a modified embodiment of the hitch base 102 as shown in FIGS. 19-23, in which the lower portion 119 of the draw bar 104 is formed with the pin receiving apertures 117 but not the guide slots 138 and the guide pins 28 are removed from the hitch ball mount 7. It is also foreseen that the upper and lower portions 115 and 119 of the draw bar of hitch base 102 could be of a uniform width and the lower portion 119 could be formed longer with additional pin receiving apertures 117

Hitch base 161, shown in FIGS. 30-33 is a modified version of hitch base 102 and includes a draw bar 162 and shaft 163. Recess 164 is formed in an upper portion 165 of the hitch base 161 and is U-shaped instead of square as with recess 124 in draw bar 104. First and second side flanges or reinforcing ribs 167 and 168 are formed on either side of the recess 164 but no flange wall is formed across the top of the upper portion 165. The thinner section of material formed in the upper portion 165 of the draw bar 162 between the side flanges 167 and 168 may be referred to as web 170. Shaft 163 is welded to a front face of the web 170 proximate an upper edge thereof and centered between the side flanges 167 and 168. A gap 172 formed by the recess 164 and between sides of the shaft 163 and side flanges 167 and 168 and between a bottom edge of the shaft 163 and a lower portion 174 of the draw bar 162 adjacent the recess 164 is wide enough to receive the distal end of a square tube receiver 2 therein. Hitch base 161 is shown with pin receiving apertures 175 in the lower portion for securing a hitch mount 7 thereto with securement pins 39 and may also include guide slots (not shown) for receiving guide pins, such as guide pins 28 in the hitch mounts 7 discussed previously.

Hitch base 181, shown in FIGS. 34-37 is a modified version of hitch base 161 with a U-shaped recess 182 formed in a front face 183 of an upper portion 184 of a draw bar 185 The recess 182 extending into the upper portion 184 forms a web 186 extending between side flanges or sidewall flanges 187 and 188. A shaft 190 is welded to and projects forward from the web 186 proximate an upper edge of the upper portion 184. When the shaft 190 is secured within a square tube receiver 2 of a receiver hitch assembly 103, the distal end 128 of the receiver 2 extends into the recess 182 and in closely spaced relation to a front face of the web 186 with the sidewall flanges 187 and 188 projecting along the sides of the distal end of the receiver 2

A rear face 191 of the upper portion 184 is bifurcated with an upper section 192 extending generally vertical and parallel to the web 186 or front face 183 and a lower section 193 sloping rearward and downward at an acute angle of approximately thirty degrees relative to the front face 183 or web 186 of the draw bar 185. The material forming the web 186 in the upper section 192 of the upper portion 184 of the draw bar 185 and extending rearward of the distal end of the receiver 2 is sufficiently thin to avoid engagement by the MultiPro tailgate when both sections 24a and 24b of the tailgate 24 are lowered to a lowered position as shown in FIG. 46. With the hitch base 181 secured within receiver 2, the lower section 193 of the upper portion 184 is spaced below a lower edge of the tailgate 24 in the lowered position so as not to engage the tailgate.

A rear face 195 of a lower portion 196 of the draw bar 185 extends generally vertically. A cut-out or recess 197 is formed in a front face 198 of the lower portion 196 to reduce the material required for construction and the weight of the hitch base 181. Four pin receiving apertures 199 are shown formed in the lower portion 196 of draw bar 185 extending in vertically spaced alignment though the sides of the lower portion 196 for connection of a hitch mount 7 thereto with securement pins 39 and may also include guide slots (not shown) for receiving guide pins, such as guide pins 28 in the hitch mounts 7 discussed previously. In the embodiment shown, the width of the lower portion 196 is reduced relative to the width of the upper portion 184.

FIGS. 38-41 show a hitch base 201 with a draw bar 203 which is a modified version of the draw bar 43 of the embodiment shown in FIGS. 5-8. An upper portion 205 is formed wider than the lower portion 206 with side flanges 207 and 208 connected to and projecting forward from a front face 211 of the upper portion 205 in spaced relation from shaft 213. Shaft 213 is welded to and extends forward of front face 211. Shaft 213 is shown centered relative to the sides of upper portion 205 and proximate an upper edge thereof. Gaps 215 and 216 between the shaft 213 and side flanges 207 and 208 are sized for extension of sides of the distal end 128 of the tube receiver 2 within the gaps 215 and 216. The side flanges 207 and 208 resist shearing of the draw bar 203 from the shaft 213 along the lower edge of the shaft 213 and lower corners which are subjected to increased loads or stress when the hitch base 201 is in use towing a vehicle. The draw bar 203 is shown with vertically aligned pin receiving apertures 218 extending through the sides of the lower portion 206 for connection of a hitch mount 7 thereto with securement pins 39 and may also include guide slots (not shown) for receiving guide pins, such as guide pins 28 in the hitch mounts 7 discussed previously.

FIGS. 42-45 show the hitch assembly 101 of FIGS. 19-23 with a modified hitch ball mount 221 mounted thereon. Hitch ball mount 221 includes a hitch ball assembly 223 with three hitch balls 225 rotatably connected to a platform 227 supported between mounting flanges 231 and 232. Guide pins 235 extending inward from each of the opposed mounting flanges 231 and 232 of the hitch ball mount 221 extend into the guide slots 138 on opposite sides of the draw bar 104 to permit the hitch ball mount 221 to slide relative to the draw bar 104 while remaining connected thereto.

Two pairs of pin receiving holes 237 are formed through the mounting flanges 231 and 232 proximate distal edges thereof. With the guide pins 235 extending in the guide slots 138, securement pins 239 are insertable through aligned sets of pin receiving holes 237 in the mounting flanges 231 and 232 and pin receiving apertures 117 in the draw bar 4 to secure the hitch ball mount 221 to the draw bar 104 at a selected height. The hitch ball mount 221 may be pinned to the draw bar 104 to extend rearward of the draw bar 104 for towing or may be pinned to the draw bar 104 to extend forward of the draw bar 104 and under the shaft 105 in a stowed position. The pin receiving holes 237 comprise a first position securement feature on the draw bar 104 and the securement pins 239 comprise a second position securement feature associated with the hitch ball mount 221 useable to secure the hitch ball mount 221 to the draw bar 104 at one of a plurality of selected heights relative thereto.

Figure 45:
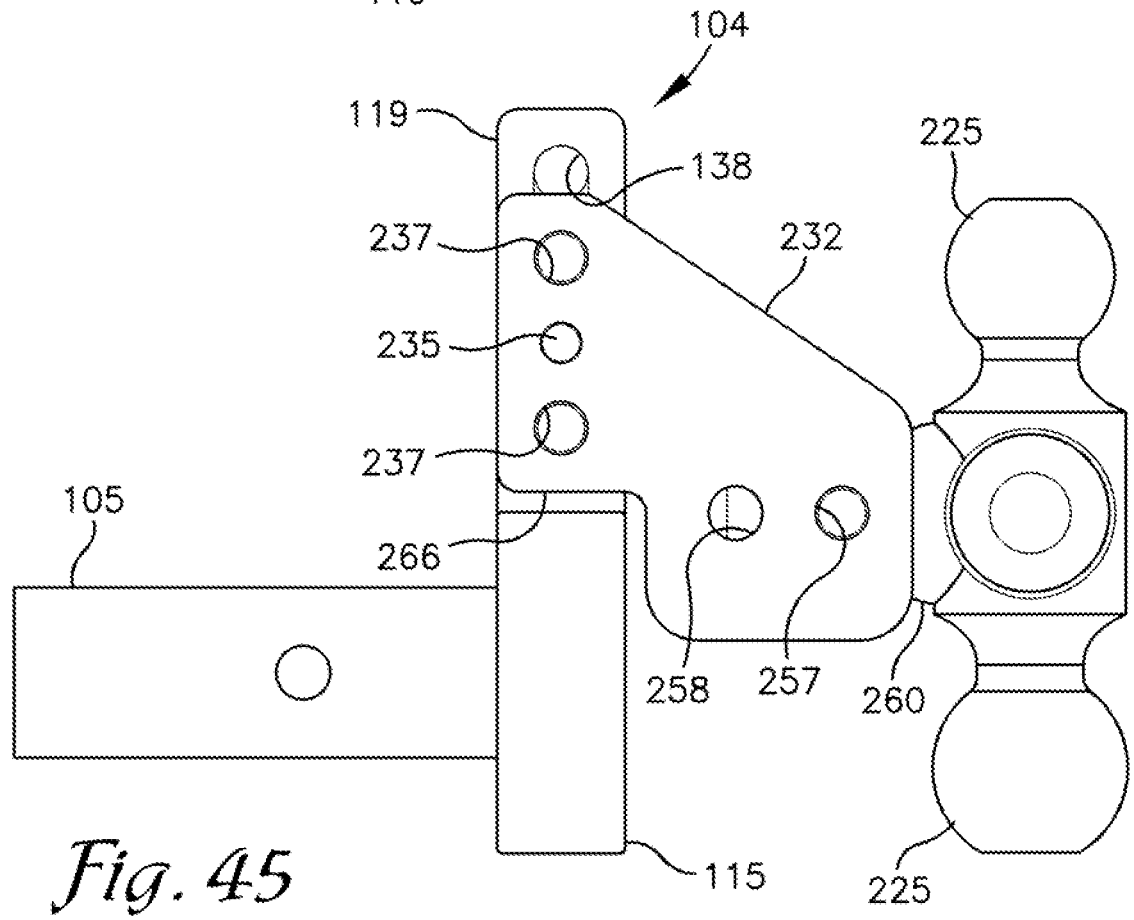
FIG. 45 is a left elevational view of the hitch assembly and offset hitch ball mount as in FIG. 42 with the hitch assembly base rotated ninety degrees about an axis through a shaft of the hitch assembly base so that the lower portion of the draw bar extends above the upper portion of the draw bar.

With four pin receiving apertures 117 formed in draw bar 104, the hitch ball mount 221 may be positioned at two positions relative to the draw bar 104. In addition, as shown in FIG. 45, the orientation of draw bar 104 may be reversed so that the lower portion 119 extends above the shaft 105 and receiver in which the shaft is received such that at least 4 vertical positions of the hitch ball mount 221 are allowed.

Figure 19:
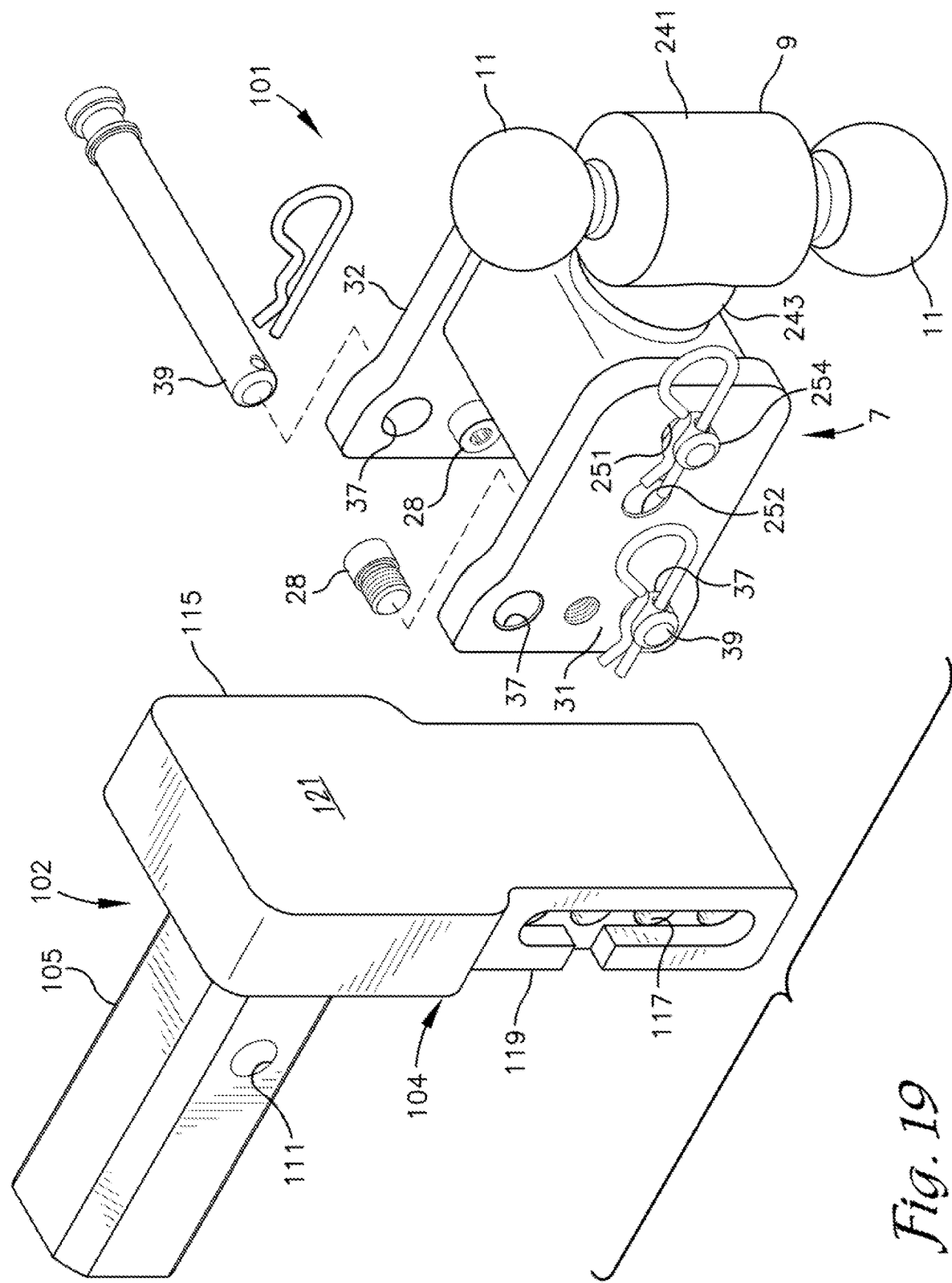
FIG. 19 is an exploded, rear perspective view of a seventh alternative height adjustable, multi-ball hitch assembly showing a hitch ball mount separated from a hitch base comprising a draw bar and shaft.

The mounting flanges 231 and 232 of hitch ball mount 221 are modified relative to mounting flanges 31 and 32 of hitch ball mount 7 as shown in FIG. 19 so that the pin receiving holes 237 are offset below or above the platform 227 (depending on the orientation of the draw bar 104) whereas in hitch ball mount 7, the platform 34 extends between the pin receiving holes 37. Referring to FIGS. 19 and 23, the hitch ball assembly 9 shown connected to platform 34 comprises balls 11 projecting from an intermediate portion 241 and a shaft or spindle 243 projecting from the intermediate portion 241 along a shaft axis extending transverse to the axes extending through the hitch balls 11. The platform 34 may be formed from a section of square tubing with opposite ends welded to the mounting flanges 31 and 32. Outer and inner holes 245 and 246 are formed through the vertical walls of the tubing and the shaft 243 of the hitch ball assembly 9 is received therein. A locking ring 247 mounted within a groove in the distal end of the portion of shaft 243 extending past the inner wall of the platform 34 is used to rotatably secure shaft 243 to the square tube forming platform 34.

Two pin receiving bores or first and second bores 248 and 249 respectively are formed through the shaft 243 in spaced relationship along the longitudinal axis of the shaft 243 and are oriented in an offset or transverse relationship with a bore axis of the first bore 248 extending perpendicular to a bore axis of the second bore 249. The axis of first bore 248 extends perpendicular to an axis extending through the balls 11 and the axis of second bore 249 extends parallel to the axis extending through the balls 11.

Two pairs of aligned pin receiving holes 251 and 252 extend through the mounting flanges 31 and 32 in horizontal alignment. The first pair of pin receiving holes 251 align with the first bore 247 in shaft 243 when the axis through the hitch balls 11 extends vertically and the second pair of pin receiving holes 252 align with the second bore 248 in shaft 243 when the axis through the hitch balls extend horizontally. A locking pin 254 inserted through the first pair of pin receiving holes 251 and the aligned first bore 247 secure the hitch balls in the vertical alignment for towing. An operator can select between the two sized hitch balls 11 by rotating the hitch ball assembly 180 degrees to position the desired hitch ball 11 to extend above the other hitch ball 11 and then securing the hitch ball assembly 9 in place by inserting pin 254 through aligned pin receiving holes 251 and bore 248. Insertion of the locking pin 254 through the second pair of pin receiving holes 251 and the aligned second bore 249 secures the hitch balls 11 in a horizontal alignment so that the hitch ball mount 7 and hitch ball assembly 9 may be secured in a stowed position under the shaft 105 of the hitch bae 102. The pin receiving holes 251 and 252 formed in mounting flanges 31 and 32 generally extend in spaced relation on a horizontal axis extending between the pin receiving holes 37 formed along distal ends of the mounting flanges 31 and 32 so that the rotational axis of hitch ball assembly shaft 243 extends directly in front of the connection of the hitch ball mount 7 to the draw bar 104.

Referring to FIGS. 42-45, the mounting flanges 231 and 232 also include two pairs of aligned pin receiving holes 257 and 258 extending through the mounting flanges 231 and 232 in horizontal alignment similar to pin receiving holes 251 and 252 in mounting flanges 31 and 32. Hitch ball assembly 223 also includes a shaft 260 extending into platform 227 with first and second bores (not shown) extending through the shaft in spaced and transverse relationship. The first pair of pin receiving holes 257 align with the first bore in shaft 260 when the axis through the opposed hitch balls 225 extends vertically and the axis through the third hitch ball extends horizontally. The second pair of pin receiving holes 258 align with the second bore in shaft 260 when the axis through the opposed hitch balls 225 extends horizontally and the axis through the third hitch ball extends vertically. The hitch ball assembly 223 can be secured in four different orientations at ninety-degree increments through selective positioning of a locking pin 264 through aligned pairs of pin receiving holes 257 and 258 with the first and second bores respectively. In one orientation, the two opposed hitch balls 225 extend horizontally and the third hitch ball projects downward to allow the platform 227 and hitch balls 225 to be positioned in a stowed alignment under the draw bar trunnion 105.

Figure 42:
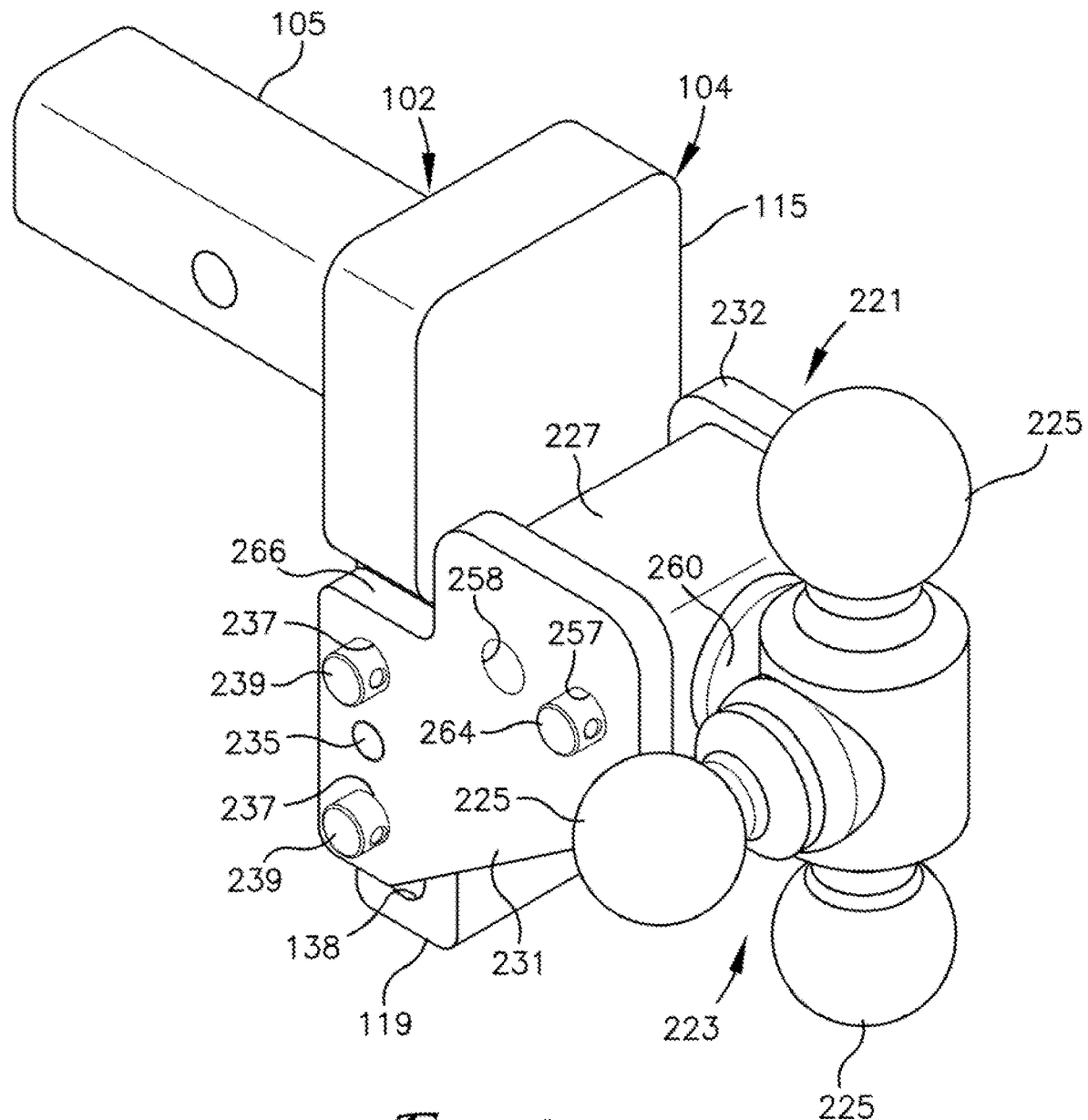
FIG. 42 is a rear, perspective view of the seventh alternative height adjustable, multi-ball hitch assembly as in FIG. 19 showing a modified, offset hitch ball mount secured thereto.
Figure 44:
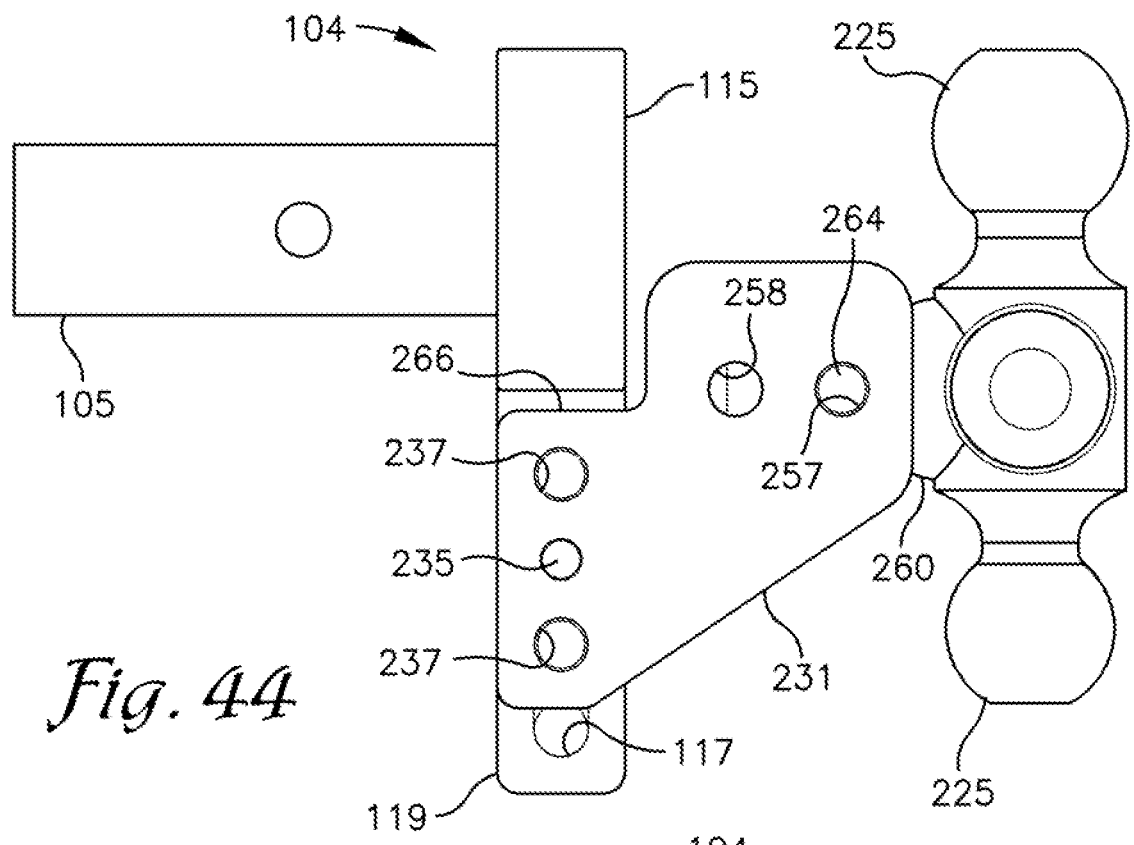
FIG. 44 is a left elevational view of the hitch assembly and offset hitch ball mount as in FIG. 42 with a lower portion of a draw bar of the hitch assembly base extending below an upper portion thereof.

An axis extending through the horizontally aligned pin receiving holes 257 and 258 extends perpendicular to an axis through vertically aligned pin receiving holes 237. And the pin receiving holes 257 and 258 are offset above or below the pin receiving holes 237 depending on the orientation of the hitch ball mount 221 on the draw bar 104. As shown in FIGS. 42 and 44-45, a recess or cut-out 266 is formed in the mounting flanges receive or accommodate the wider upper portion 115 of the draw bar 104.

Figure 43:
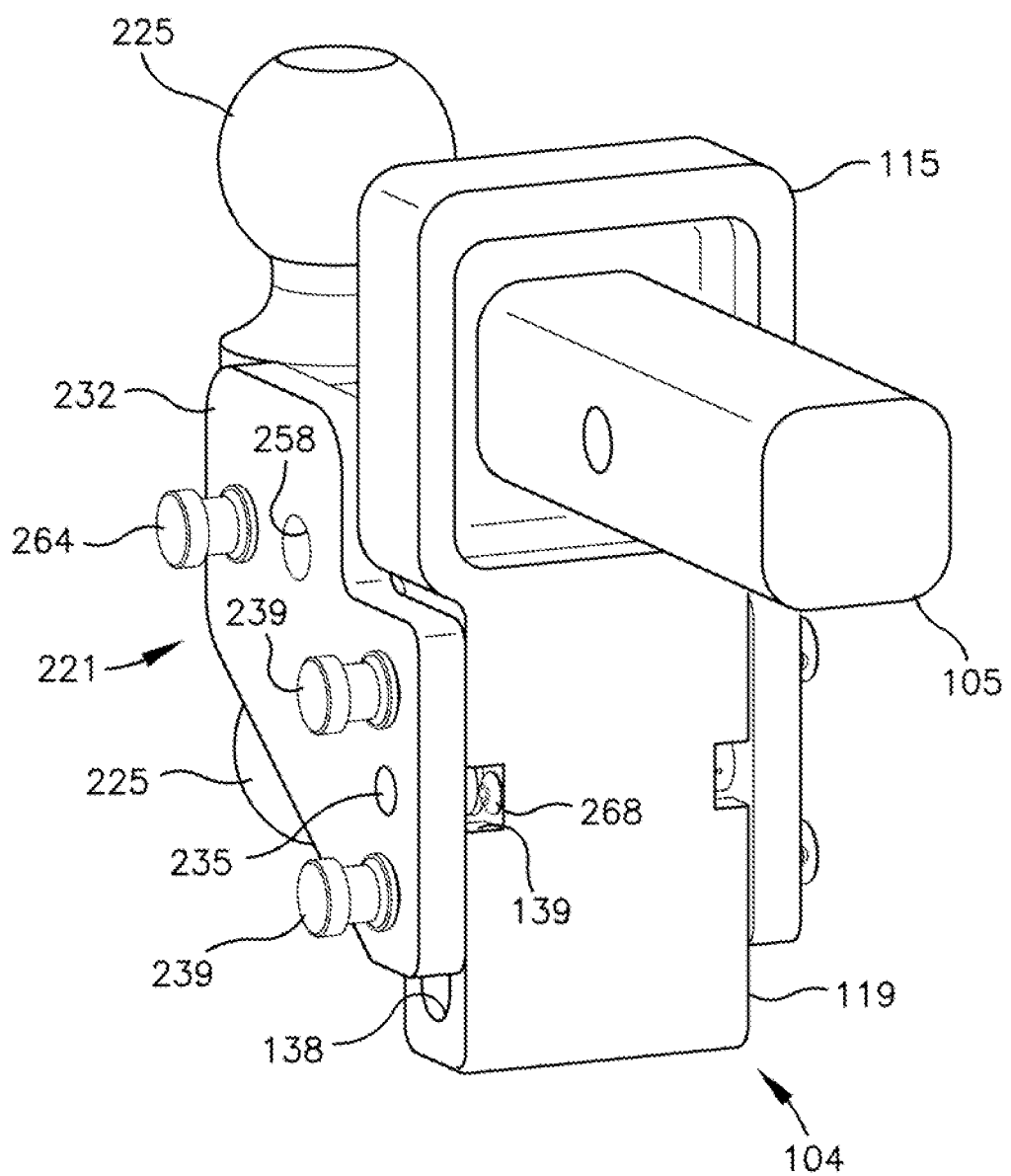
FIG. 43 is a front, perspective view of the hitch assembly and the offset hitch ball mount as in FIG. 42.

Referring to FIG. 43, a set screw 268 is shown secured in one of the access legs 139 of one of the guide slots 138 to prevent separation of the hitch ball mount 221 from the draw bar 104. The hitch ball mount 221 is secured to the draw bar 104 so that when the lower portion 119 of draw bar 104 extends below upper portion 115, the platform 227 extends upwards relative to the connection of the distal ends of the mounting flanges 231 and 232 to the lower portion 119 of draw bar 104. Downward projection of the platform 227 and attached hitch balls 225 relative to the lower portion 119 of the draw bar 104 could result in a downward extending hitch ball 225 hitting the ground and damaging the draw bar 104 or the connection of the draw bar 104 to trunnion 105.

It is foreseen that the components described herein could be formed from a variety of materials and using a variety of methods including steel components welded together or using an aluminum billet or extruded aluminum or steel castings or from forged steel.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed and desired to be secured by Letters Patent is as follows:

1. A hitch assembly including a hitch base adapted for securement in a tube receiver connected to a towing vehicle, the hitch base comprising:
a draw bar having an upper portion and a lower portion with a plurality of first, position securement features extending in vertically spaced alignment in the lower portion of the draw bar, a forward facing surface of the upper portion of the draw bar is recessed rearward relative to a front face of at least the upper portion of the draw bar, and the upper portion of the draw bar is wider than the lower portion of the draw bar; and
a shaft extending forward from the forward facing surface of the upper portion of the draw bar, the shaft sized for reception in the tube receiver.

2. The hitch assembly as in claim 1 further comprising a hitch ball mount and at least one second, position securement feature usable in cooperation with at least one of the first, position securement features to secure the hitch ball mount to the draw bar at one of a plurality of vertical positions relative thereto.

3. The hitch assembly as in claim 2 wherein none of the first position securement features are located in the upper portion of the draw bar.

4. The hitch assembly as in claim 1 wherein a recess is formed in the front face of the upper portion of the draw bar between side wall flanges, the recess extending forward from the forward facing surface of the upper portion of the draw bar, the forward facing surface formed on a web extending between the sidewall flanges and the shaft.

5. The hitch assembly as in claim 1 wherein a recess is formed in the front face of the upper portion of the draw bar with side wall flanges extending along opposite sides of the recess and a top wall flange extending across an upper edge of the upper portion of the draw bar with the top wall flange connected to the sidewall flanges, the recess extending forward from the forward facing surface of the upper portion of the draw bar, the forward facing surface formed on a web extending between the sidewall flanges and the shaft extending forward from the web such that a gap is formed around the shaft and the sidewall flanges and top wall flange, wherein the gap is sized for extension of a distal end of a tube receiver in the gap when the shaft is secured in the tube receiver.

6. The hitch assembly as in claim 4 wherein the shaft is formed separate from the draw bar, the draw bar has a weldment hole formed through the web of the upper portion, a head of the shaft extending in the weldment hole forms a weldment groove in a rearward facing surface of the upper portion of the draw bar and in which a weld is formed between the head of the shaft and the web of the upper portion of the draw bar.

7. A hitch assembly including a hitch base adapted for securement in a tube receiver on a towing vehicle, the hitch base comprising:
a draw bar having an upper portion and a lower portion, the lower portion of the draw bar including a plurality of first, position securement features extending in vertically spaced alignment and the upper portion of the draw bar is wider than the lower portion of the draw bar;
a shaft sized for reception in the tube receiver and extending forward from a receiver abutment surface formed on the upper portion of the draw bar, surrounding the shaft and recessed rearward relative to a front face of the lower portion of the draw bar such that when the shaft is inserted into the tube receiver until a distal end of the tube receiver abuts against the receiver abutment surface, the front face of the lower portion of the draw bar extends under the tube receiver in forward spaced relation relative to the receiver abutment surface.

8. The hitch assembly as in claim 7 further comprising a hitch ball mount and at least one second, position securement feature usable in cooperation with at least one of the first, position securement features to secure the hitch ball mount to the draw bar at one of a plurality of vertical positions relative thereto.

9. The hitch assembly as in claim 7 wherein none of the first, position securement features are located in the upper portion of the draw bar.

10. The hitch assembly as in claim 7 wherein the hitch base further comprises first and second sidewall flanges formed on the upper portion of the draw bar and projecting forward from the receiver abutment surface on opposite sides of the shaft, the sidewall flanges spaced outward from the shaft forming a recess between the sidewall flanges and the shaft, the recess sized to receive a sidewall of the tube receiver therein such that the distal end of the tube receiver is advanceable into abutment with the receiver abutment surface.

11. The hitch assembly as in claim 10 wherein the first and second sidewall flanges of the hitch base are formed integral with the lower portion of the draw bar and the recess extending between the sidewall flanges and the shaft extends between the lower portion of the draw bar and the shaft.

12. The hitch assembly as in claim 11 wherein the hitch base further comprises a top wall flange extending across an upper edge of the upper portion of the draw bar with the top wall flange extending between the first and second sidewall flanges and the recess between the first and second sidewall flanges and the shaft extends between the top wall flange and the shaft.

13. The hitch assembly as in claim 7 wherein said first, position securement features of the hitch base comprise pin receiving bores extending laterally through the lower portion of the draw bar.

14. The hitch assembly as in claim 13 further comprising a hitch ball mount with at least one hitch ball connected thereto and having at least one pair of vertically aligned apertures formed in opposed mounting flanges of the hitch ball mount and a locking pin insertable through the at least one pair of vertically aligned apertures in the mounting flanges of the hitch ball mount aligned with one of the pin receiving bores in the lower portion of the draw bar to secure the hitch ball mount to the draw bar at one of a plurality of vertical positions relative thereto.

15. The hitch assembly as in claim 7 wherein the front face and a rear face of the draw bar extend in approximately parallel planar relationship.

16. A hitch assembly including a hitch base adapted for securement in a tube receiver connected to a towing vehicle, the hitch base comprising:
- a draw bar having an upper portion and a lower portion, a recess is formed in a front face of the upper portion of the draw bar between side wall flanges, the recess extending forward from a forward facing surface of the upper portion of the draw bar, the forward facing surface formed on a web extending between the sidewall flanges, a weldment hole is formed through the web of the upper portion of the draw bar; and
- a shaft sized for reception in the tube receiver, the shaft is formed separate from the draw bar and is connected to and projects forward from an enlarged head, the enlarged head is secured within the weldment hole in mating relationship with the web and with the shaft extending forwardly from the forward facing surface of the web, the enlarged head secured within the weldment hole forms a portion of weldment groove in a rearward facing surface of the upper portion of the draw bar and in which a weld is formed between the head of the shaft and the web of the upper portion of the draw bar;
- the draw bar includes a plurality of first, position securement features extending in vertically spaced alignment in the lower portion of the draw bar.

17. The hitch assembly of claim 16 wherein the upper portion of the draw bar is wider than the lower portion of the draw bar.

18. The hitch assembly as in claim 16 further comprising a hitch ball mount and at least one second, position securement feature usable in cooperation with at least one of the first, position securement features to secure the hitch ball mount to the draw bar at one of a plurality of vertical positions relative thereto.

* * * * *